United States Patent [19]

Lee et al.

[11] Patent Number: 5,648,957
[45] Date of Patent: Jul. 15, 1997

[54] DISTRIBUTOR EMPLOYING CONTROLLED SWITCHING ELEMENTS

[75] Inventors: Byoung ki Lee, Seoul; Jung-kyu Lee, 312-605, Chookong Apartment, Sanggye-Dong, Nohwon-Ku, Seoul, both of Rep. of Korea

[73] Assignees: Byoung-ki Lee; Jung-kyu Lee; Gold Star Information & Communications, Ltd., all of Seoul, Rep. of Korea

[21] Appl. No.: 388,973

[22] Filed: Feb. 15, 1995

[30] Foreign Application Priority Data

May 6, 1994 [KR] Rep. of Korea ............................ 9956

[51] Int. Cl.⁶ ........................................................ H04L 12/56
[52] U.S. Cl. ........................ 370/355; 340/826; 340/825.8; 370/388; 370/415; 370/434
[58] Field of Search ........................... 370/58.1, 58.2, 370/58.3, 60, 60.1, 56, 94.1, 94.2, 54, 65.5; 340/825.3, 826, 825.79, 825.8

[56] References Cited

U.S. PATENT DOCUMENTS

| | | | |
|---|---|---|---|
| 5,132,965 | 7/1992 | Zhang | 370/60 |
| 5,148,428 | 9/1992 | Lee | 370/60 |
| 5,258,752 | 11/1993 | Fukaya et al. | 340/825.8 |
| 5,305,311 | 4/1994 | Lyles | 370/60 |

OTHER PUBLICATIONS

Lee et al., *A New Distribution Network Based on Controlled Switching Elements and Its Applications*, IEEE/ACT Trans. of Networking, vol. 3, No. 1, pp. 70–81 (Feb. 1995).

Lee et al., *ECI Value Generations in CSE–Based Distributors*, (source and publication date unknown).

Kim et al., *A Self–Routing Multistage Switching Network for Broadband ISDN*, IEEE Jour. Sel. Areas in Comm., vol. 8, No. 3, pp. 459–466 (1990).

Lee, *Nonblocking Copy Networks for Multicase Packet Switching*, IEEE. Jour. Sel. Areas in Comm., vol. 6, No. 9 pp. 1455–1467 (Dec. 1988).

Bianchini Jr., et al., *Design of a Nonblocking Shared–Memory Copy Network for ATM*, Proc. of INFOCOM, pp. 476–485 (1992).

Kim et al., *Nonblocking Property of Reverse Banyan Networks*, IEEE Trans. on Comm., vol. 40, No. 3, pp. 872–876 (1992).

Narashimha, *A Receive Concentrator Structure with Application to Self–Routing Switching Networks*, IEEE Trans. on Comm. vol. 42, No. 2/3/4, pp. 896–898 (1994).

*Primary Examiner*—Alpus H. Hsu
*Assistant Examiner*—Seema S. Rao
*Attorney, Agent, or Firm*—Baker, Maxham, Jester & Meador

[57] ABSTRACT

A distributor with controlled switching elements (CSE) which simplifies hardware construction by distributing the function of a running adder into a reverse banyan network. The distributor comprises a CSE-based network using switching stages, each switching stage having control switching elements. A control signal input stage switches two packet input signal switching channels, each stage receiving each control signal from an output stage having switching elements. An active packet counter counts and generates an output signal which represents the number of active packets inputted to the CSE network. A tail-of-queue register is used for storing output vectors.

10 Claims, 20 Drawing Sheets

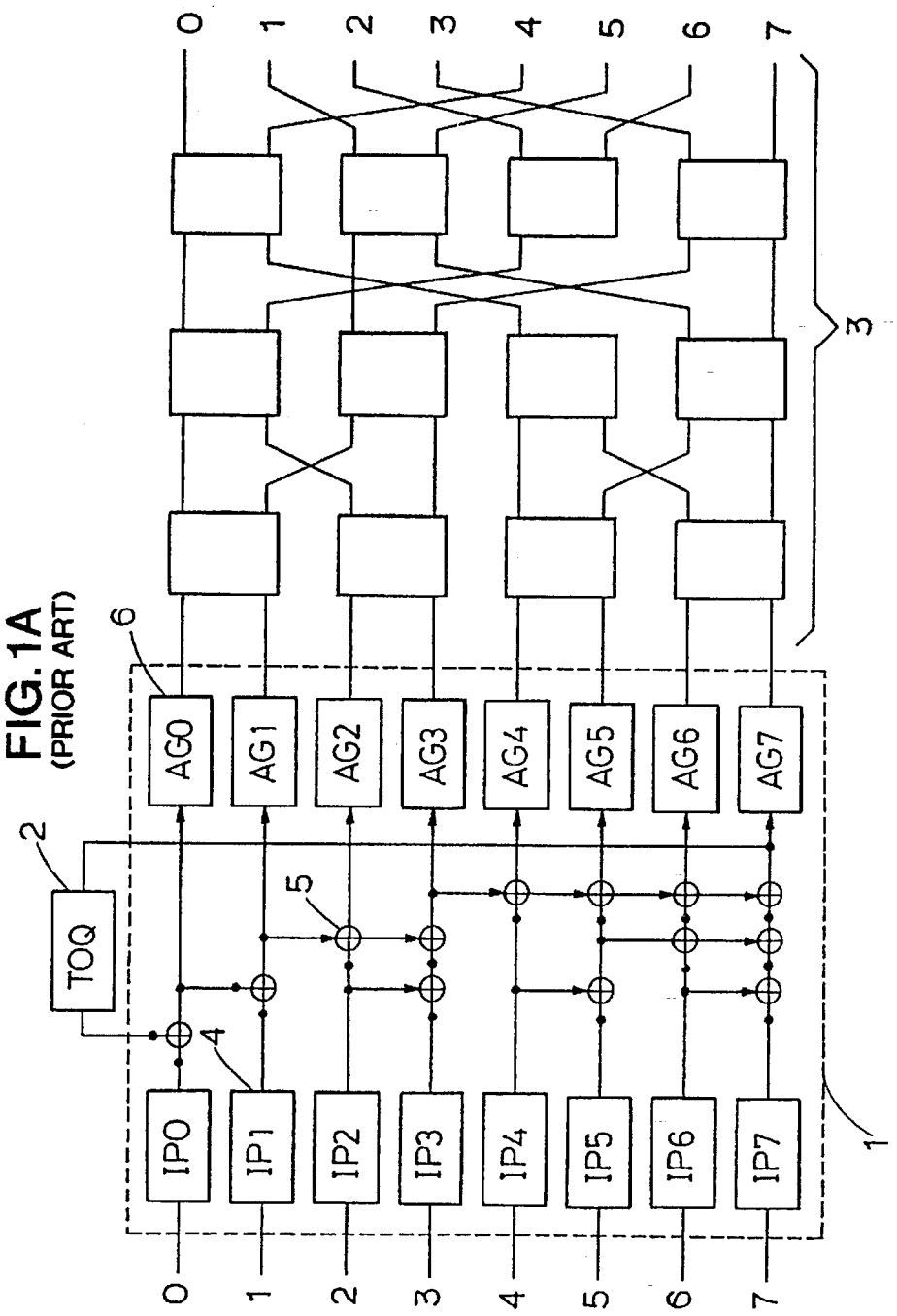
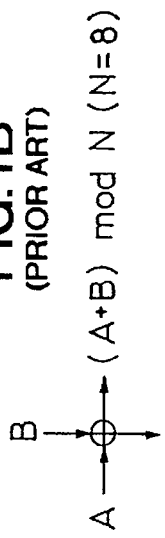
FIG. 1A (PRIOR ART)
FIG. 1B (PRIOR ART)
$A \rightarrow \oplus \rightarrow (A+B) \bmod N \ (N=8)$
$B \rightarrow$ FIG.11A
FIG.11B
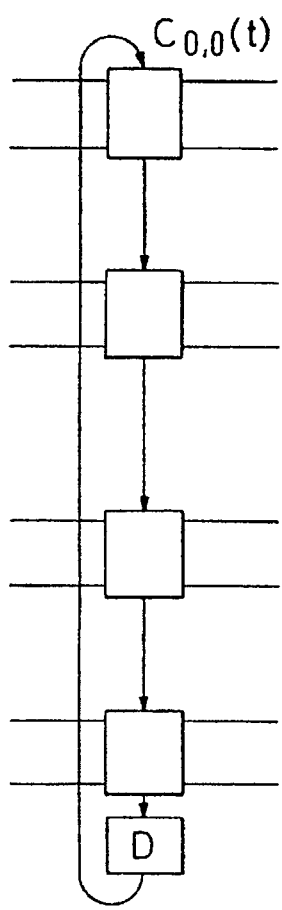
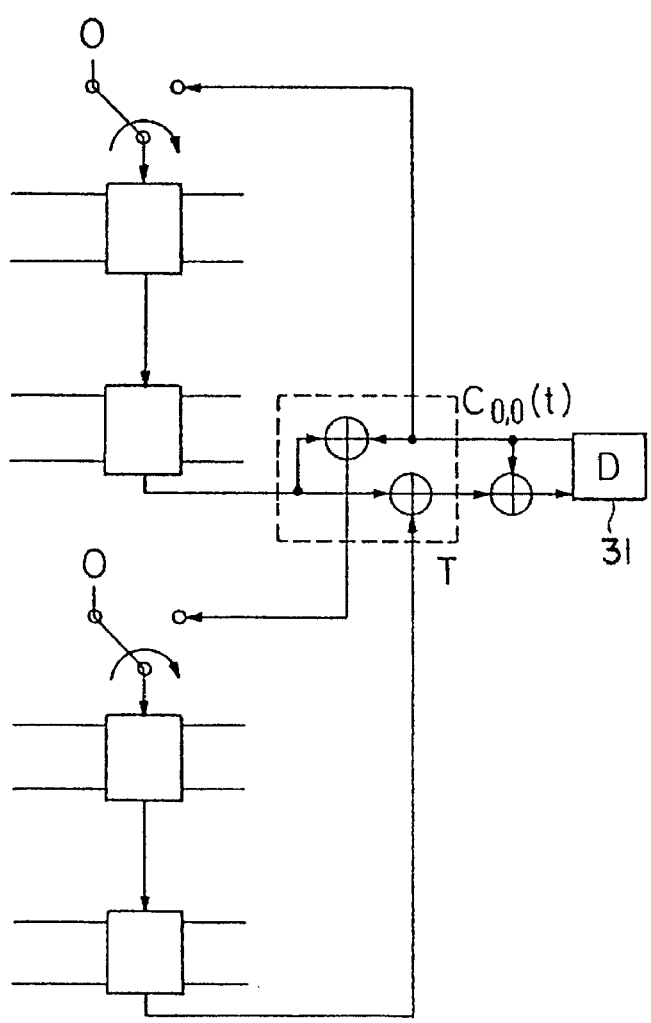

FIG. 13B
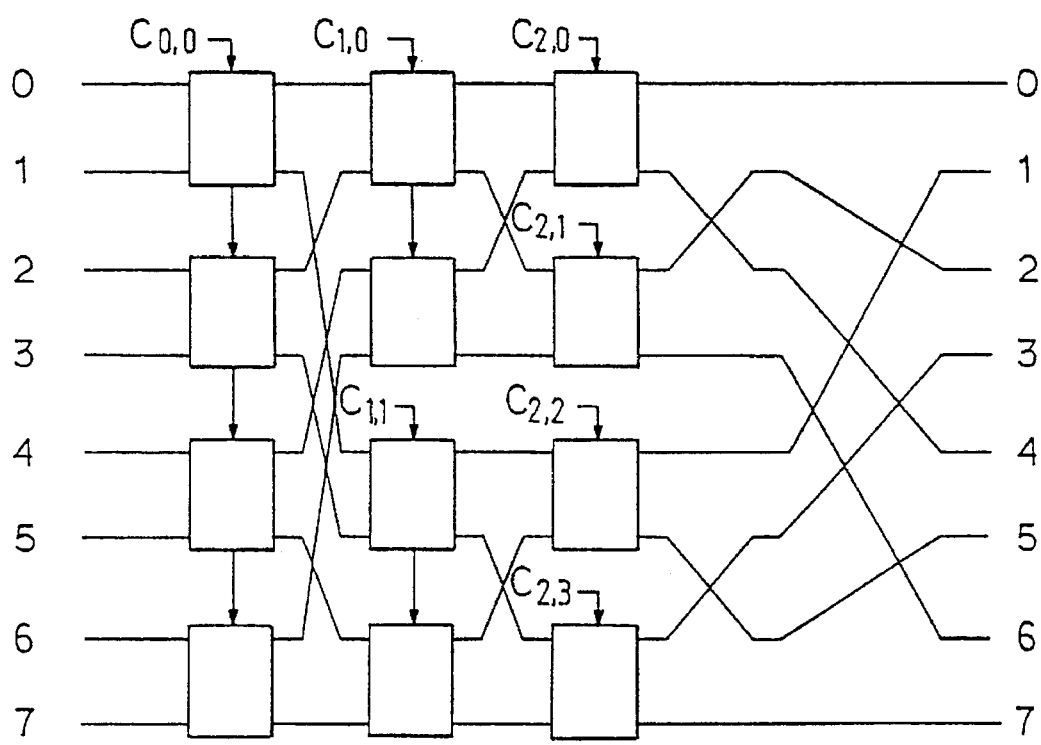
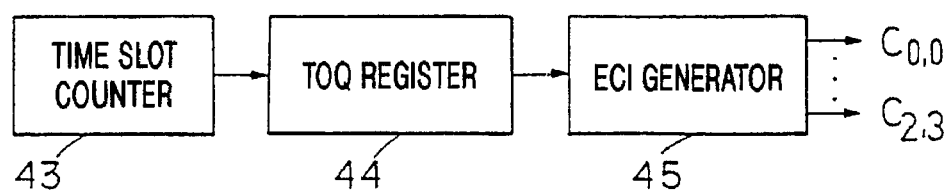

DISTRIBUTOR EMPLOYING CONTROLLED SWITCHING ELEMENTS

BACKGROUND OF THE INVENTION

The present invention relates to a distributor for improving the performance of a input-queueing Fast Packet Switch proposed to the switching structure of BISDN(Broadband Integrated Services Digital Network).

In general, the input-queueing fast packet switch has awoke a great interest because though the performance of the input-queueing fast packet switch is lower than that of an output-queueing fast packet switch which is another switching construction in the side of a maximum throughput and delay, the hardware construction of the former is simpler than that of the latter and the speed of a switching operation of the former is not higher than that of a input signal. However, the input-queueing fast packet switch shows a considerable drop in performance at a certain input traffic pattern because it does not efficiently make use of a Buffer, and the distributor is used for solving the above problem.

As the distributor is to generalize more than the function of the concentrator which is frequently used in a conventional circuit switching network, the distributor fulfills the function of concentrating and outputting the only active packet among input packets. The term "activity" in its original sense means that a packet slot is filled with a real packet. However, the definition of active could be extended depending on the application. It has been widely applied for a cost-effective implementation of switching systems or for separating active packets from the inactive packets. And then, the relation of positions between the active packets is preserved and the starting point of a concentrated active packet stream can become all output ports. Therefore, by being located the distributor before input buffers, the input active packets can be sequentially distributed to the buffers. That is, the difference of the number of the active packets which are stored in each buffer is one at most and consequently the buffer can be efficiently utilized.

Also, the distributor can consist of an internal-queueing fast packet switch, and the distributor is often used as the very important element consisting of a Multi-channel fast packet switch which preserves the sequence between the input packets.

The conventional distributor comprises a running adder and a reverse banyan network which is connected to the running adder. In the construction as stated above, the running adder computes a set of dummy header for the active input packets and plays a role of appending them at the head of the active packet. The appended dummy header is used for transferring the active packets to a final output port by the reverse-banyan network.

The dummy header appended by the running adder is removed after the active packets are transferred to the final output port, in the above conventional distributor, a complex hardware is required in order to fulfill the function of computing, appending and removing the dummy header. That makes the operation speed of the reverse banyan network to be higher than the transmition speed of the input packets.

The detailed construction and operation of the existing conventional distributor will be explained below(see FIG. 1).

FIG. 1A is a construction diagram of the conventional distributor and FIG. 1B an operation state diagram of a summing element. In the above drawings, 1 denotes the running adder, 2 represents a TOQ(Tail of queue) register and 3 the reverse banyan network.

The construction and a simplified operation of the conventional distributor as illustrated in drawings will be explained below.

The running adder 1 plays a role of computing dummy header for the active packet on the basis of the values stored in the TOQ register 2 and appends them to the packets. The value stored in the TOQ register 2 always indicates the buffer address which is ready to store the uppermost packet out of the input active packets arriving at the next time slot. Therefore, when all buffers are empty, the value of the TOQ register 2 becomes 0. As the input packets arrive, the value of the TOQ register 2 is updated through the running adder 1.

And the running adder 1 comprises a plurality of IP(Input Processor) 4, a plurality of summing elements 5 and a AG(Address Generator) 6. The input processor checks the activity bit field of the arrived packet on the input port i, and assigns the value 1 to its output line if it is active, and the value 0 otherwise.

The output value of the input processor 4 and the value stored in the TOQ register 2 are changed to the input values of the corresponding AG 6 out of a plurality of AGs 6 through a plurality of the summing elements 5.

The more detailed operation of the running adder is as follows.

First, the current value stored in the TOQ register 2 are added to the output value of the input processor IP0 through a modulo-N (the size of the distributor) operation. At the same time, the result values are directly transmitted to the address generator AG0, are added to the output value of the input processor IP1. This operation is continues to the last line of the running adder 1.

The final values of the summing element 5 are inputted to the address generator 6 and the respective address generators 6 subtract 1 from the final output value of the summing elements 5. The value becomes the dummy header of the corresponding active packet. And then because the input value of the lowest address generator always indicates the buffer address which should store the first active packets arriving at the next time slot, the value of the TOQ register 2 is renewed to the input value of the lowest address generator shown in FIG. 1A without any modification.

As shown in FIG. 1B, the summing element 5 receives the two input signals A, B, and outputs the signal B through one output port and the sum signal A+B mod N through the other output port. Here, the N indicates the number of the input signals for the input processor 4.

Consequently, as stated above, the conventional distributor as above mentioned has the problem that needs a complex hardware so as to fulfill the functions of computing, appending, and removing the dummy header.

SUMMARY OF THE INVENTION

Therefore, the object of the present invention is to provide the distributor making use of the controlled switching element(CSE) having a simplified hardware construction and an improved performance by distributing the function of the running adder into the reverse banyan network.

BRIEF DESCRIPTION OF THE DRAWINGS

The above objects and other advantages of the present invention will become more apparent by describing in detail a preferred embodiment thereof with reference to the attached drawings in which:

FIG. 1A is a structure diagram of a conventional distributor.

FIG. 1B is an operation state diagram of a summing adder.

FIG. 11A–FIG. 11C is a structure diagram according to change to a parallel processing CSE-based network.

FIGS. 13A and 13B are views illustrating the network being used as a shift-sequence permutation (SSP) network for N=8, wherein FIG. 13A shows the conventional network while FIG. 13B shows the novel network in accordance with the present invention.

FIG. 14A and 14B are views illustrating examples of N×R concentrator applications, wherein FIG. 14A shows the application implemented by an iterative cell-based N×R network and FIG. 14B shows the application implemented by interconnecting the M(=N/R) R×R controlled switching element-based network.

FIGS. 15A and 15B are views illustrating examples of nonblocking point-to-point switch applications, wherein FIG. 15A shows the application consisting of a front-end concentrator and a binary radix sorting network and FIG. 15B shows the application employing the controlled switching element-based network.

FIGS. 16A and 16B are views illustrating examples of virtual FIFO queue applications, wherein FIG. 16A shows the conventional application while FIG. 16B shows the novel application employing the controlled switching element-based network in accordance with the present invention.

DETAILED DESCRIPTION OF THE INVENTION

Before explaining the detailed description of the present invention, first, let us look into the CSE-based network. For this, let us examine the construction of the conventional iterative cell-based concentrator which had been proposed by Narasimha for reference.

Figure 2:
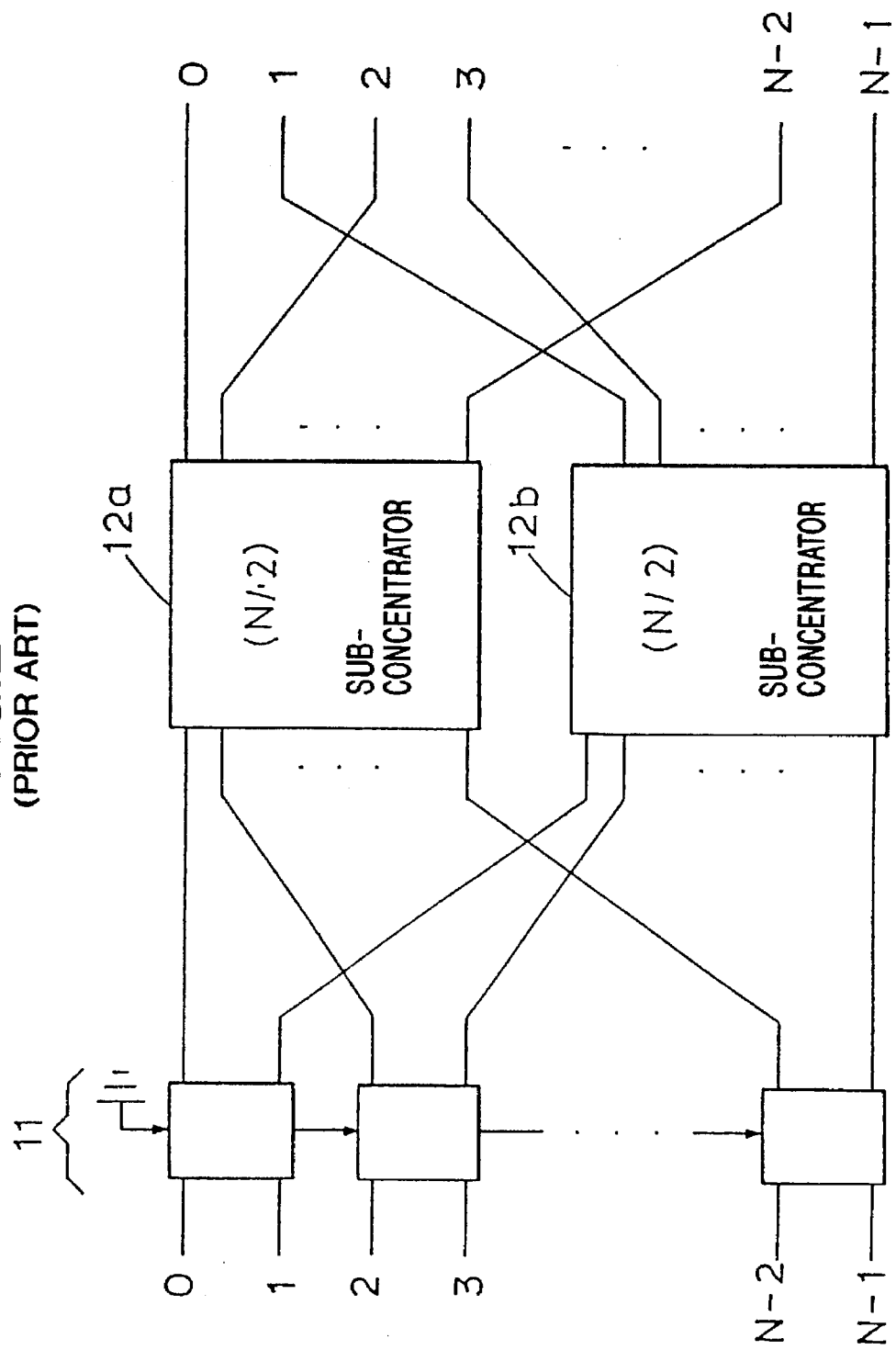
FIG. 2 is a simplified structure diagram of a conventional N×N iterative cell-based concentrator.

FIG. 2 is a simplified construction diagram of the N×N iterative cell-based concentrator, in the drawing, 11 denotes a switching stage, 12a and 12b represent a N/2 sub-concentrator respectively.

As illustrated in the drawing, the N×N iterative cell-based concentrator comprises the switching stage 11 consisting of the N/2 switching elements receiving the N active packet signals and the two N/2 sub-concentrators 12a, 12b in which the switching elements of the switching stage 11 are alternatively connected.

The switching elements in the switching stage 11 which processes the active packet which is the input signal fulfill the function of transmitting the input active packets to the two N/2 sub-concentrators 12a, 12b from the upper side alternatively. Accordingly, the two N/2 sub-concentrators 12, and 12b receive the same number of active packets. (In the drawing, the upper N/2 sub-concentrator 12a receives the active packet one more than the lower N/2 sub-concentrator 12b do in case the number of the input active packet is odd) The respective N/2 sub-concentrators 12a, or 12b concentrate and output the active packets, and the two concentrated active input packet stream is alternatively transmitted to output port. Therefore, the Operation of the concentrator can be rightly performed since the one concentrated active input packet stream can be made in total. Consequently, the concentrator having the arbitrary size can be composed of the 2×2 switching element because the respective N/2 sub-concentrators 12a or 12b can be internally again composed of the two sub-concentrators and the one stage of the switching element by the method as above mentioned.

Figure 3:
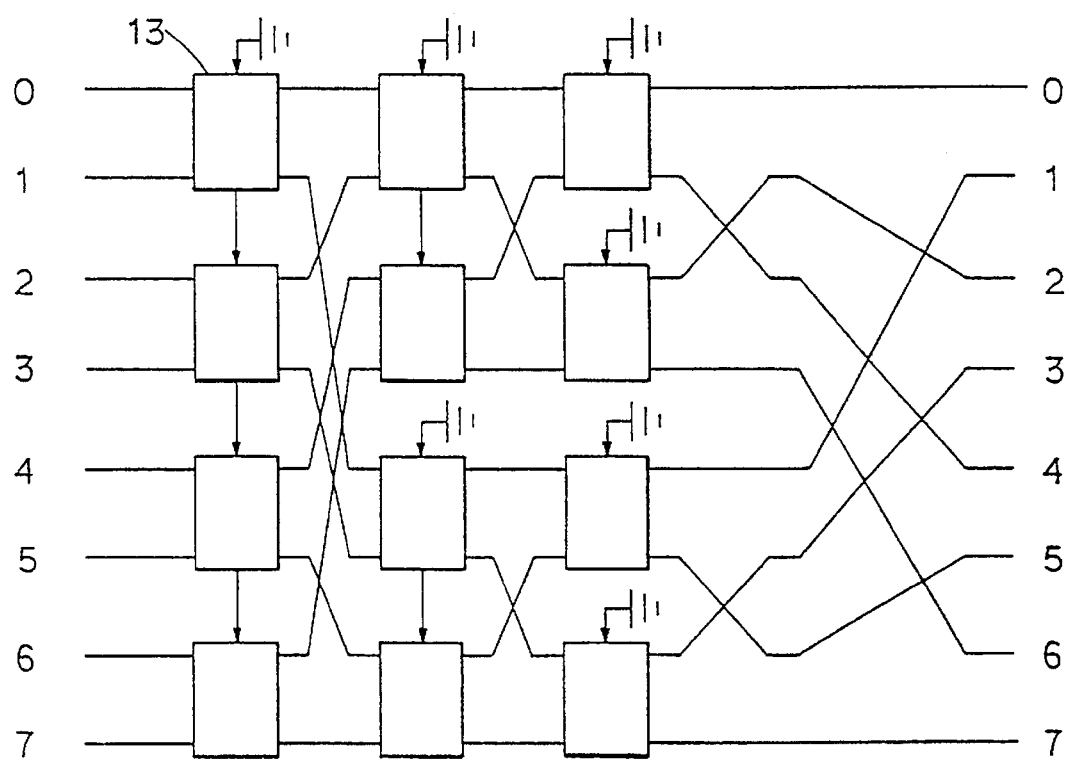
FIG. 3 is a structure diagram of a 8×8 concentrator in case N of the N×N concentrator shown in FIG. 2 is 8.

FIG. 3 is a structure diagram of a 8×8 concentrator in case N is 8 in the N×N concentrator as shown in FIG. 2, in the drawing, 13 denotes the iterative cell which is the switching element with 6 ports. The structure of the concentrator shown in the drawings is identical with the reverse banyan network in the point of the topology. However, the construction element of the concentrator shown in the drawing uses the switching element with 6 ports called the iterative cell while that of the network in the conventional reverse banyan network does the switching element with 4 ports.

Figure 4:
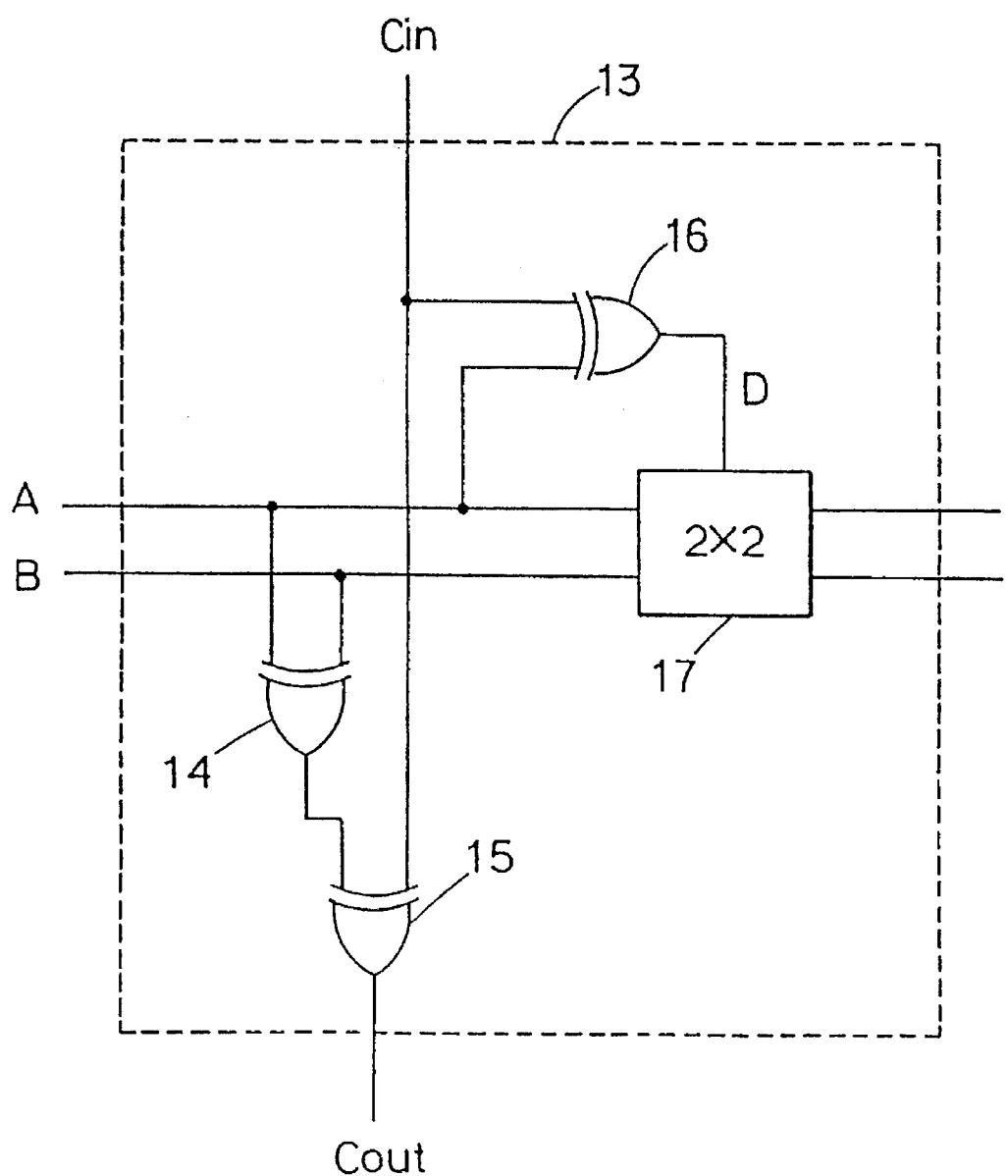
FIG. 4 is a structure diagram of the iterative cell.

As the internal construction of the iterative cell 13 is shown in FIG. 4, in the drawing, 14 and 16 denote Exclusive-OR element, 17 represents a 2×2 switching element.

As shown in FIG. 4, the iterative cell 13 comprises the 2×2 switching element 17 which receives the two active packet signals and outputs them by the channel switching according to a control signal, the Exclusive-OR element 16 receiving and modulo-summing the one of the active packet signals and the control signal provided from an external and to provide its summed value as the control signal of the 2×2 switching element 17, the Exclusive-OR element 14 receiving and modulo-summing the two active packet signals, the Exclusive-OR element 15 receiving and modulo-summing the control signal provided from the external and the output signal of the Exclusive-OR element 14 and to provide its summed value as the control signal of the adjacent iterative cells, and the 2×2 switching element 17 interlacing a input port with output port when the output signal D of the Exclusive-OR element 16 provided as the control signal is 0. And the active packet signal denotes the bit signal representing whether the active input packet is active or inactive.

The control signal $C_{in}$ inputted to a control input port represents whether the number of the active packets inputted to the upper iterative cells of itself is odd ($C_{in}=1$) or even ($C_{in}=0$). To be analogue to this, the control output signal $C_{out}$ outputted from the control output port notices the number of the active packet including its own input to the lower other switching element.

To be more detailed, let us look at the operation of the switching stage 11 of the iterative cell-based concentrator shown in FIG. 2.

All the switching elements of the switching stage 11 are connected to one another and the connection state of each switching element is controlled by the control signal inputted to the uppermost control input port in the drawing. Since the control input signals of each switching element represent that the number of the active packets inputted to their upper side are odd or even, the unit value of the control input of the uppermost switching element is always fixed to 0. For that, the control input port of the uppermost switching element in FIG. 3 connects to the ground.

Now, let us extent the meaning on the value of the control input stage so that the value not means the number of the active packet of their upper side but can be assigned to the arbitrary logic value 0 or 1. That is, for changing the control input to the one independent input port.

As knowing by the conception as stated above, the iterative cell 13 of the iterative cell-based concentrator operates as the control switching element that the connection state according to the value of the control input port alters. Therefore, let us define the control input port of the uppermost switching element as an External Control Input(ECI) port and the iterative cell stated above as the controlled switching element. And we newly define the structure of the iterative cell-based concentrator which substitutes the control switching element having the independent ECI port for the iterative cell 13 as the CSE-based network. Consequently, as this invention makes use of the CSE-based network, the above CSE-based network has a considerable variety of functions. For example, we will easily find that the CSE-based network piles all the active packets from the lowest side of a network if all the grounded control input values shown in FIG. 3 are set to 5 volts or all ECI port values change to a logic value 1. That is, the output ordering of the network becomes 7, 6, 5, 4, 3, 2, 1, 0 reversely to the general output ordering 0, 1, 2, 3, 4, 5, 6, 7. In case the only grounded control input values at the last stage in FIG.3 are all set to 5 volts, the effect of combining the concentration function and the interchange function of the active packet together occurs. That is, the output ordering of the network becomes 4, 5, 6, 7, 0, 1, 2, 3 which corresponds to the general output rotationally shifted by four times. That is, the one of the output patterns of the distributor.

Figure 5:
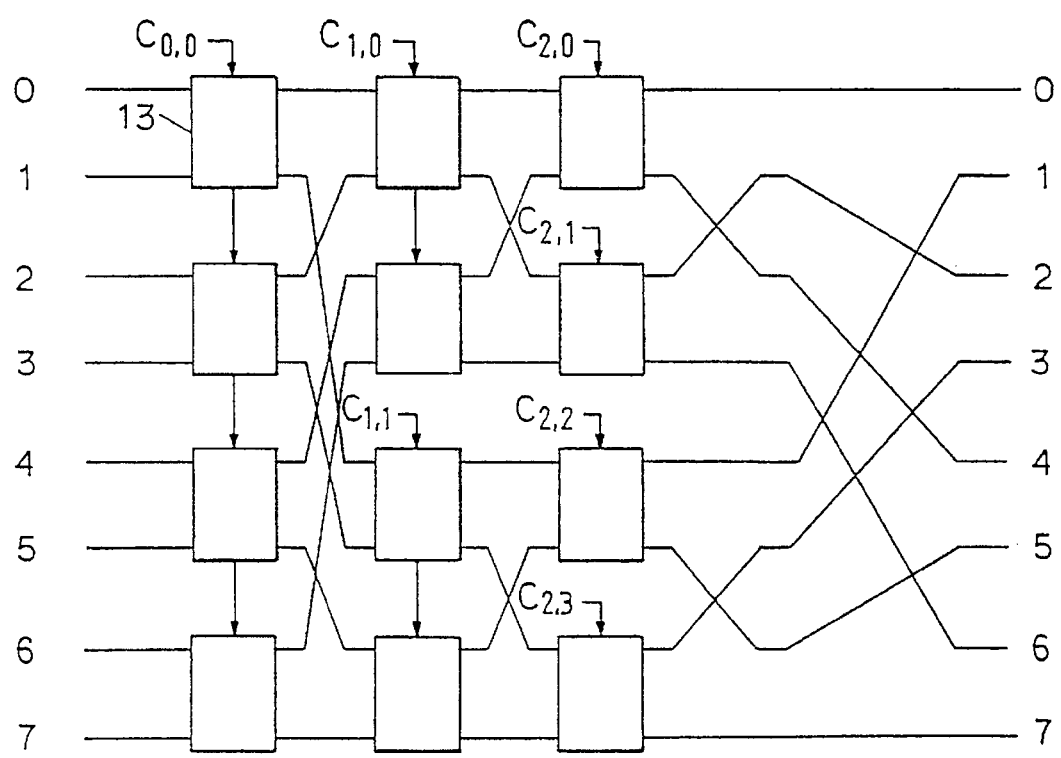
FIG. 5 is a structure diagram of a 8×8 CSE-based network according to the present invention.

Now, we will explain the CSE-based network can make all the output patterns of the distributor through the proper ECI values before we explain this invention on the basis of the principles stated above. For the convenience of explanation, suppose that ECI values are expressed as $C_{i,j}$ ($i=0, 1, \ldots, \log_2 N-1$, $j=0, 1, 2, \ldots, 2^i-1$). The first subscript of this variable indicates the stage number, the second subscript denotes the position of each stage(refer to FIG. 5).

For an N×N distributor, we denote by I and O the N-vectors respectively representing the activity status of the input and output streams. We assign value 0 to the ith element of each vector if the packet in the corresponding port is inactive, and value 1 if active. Because the distributor can have the number of different input patterns which is $2^N$, the distributor can have the number of different input vectors which is equal to the number of the number of different input patterns.

However, since the distributor plays a role of concentrating the input active packets, the distributor has the number of output vectors fewer than that of input vectors. We introduce the variable $O_{m,k}$ (m=0, 1, \ldots, N, k=0, 1, \ldots, N-1) so as to distinguish these respective output vectors. Here, m denotes the number of 1 elements within the vector, k indicates the starting point of the group of 1 elements.

Then, note that the group of 1 elements within each vector can be sometimes divided into the two groups. Then, the k becomes the starting point of the lower group. For example, the denotation method of the output vectors represented as 11100001 becomes $O_{4,7}$. k has the only value 0, in case m is the value 0. Note that, in case m is N, the starting points of the 1 element are different with one another though the k values are all the same, the denotation method of the output vectors has the same patterns for all the k values.

Because in case m is 0, the one output vector exists but in case m is not 0, the different output vectors with one another can exist, the total number of the different output vectors with one another is $N^2+1$. The output vector denoted as $O_{m,0}$ (m=0, 1, \ldots, N) among them corresponds to the output vector of the concentrator. And the above variable is used for proving the below properties of the CSE-based network.

Figure 6:
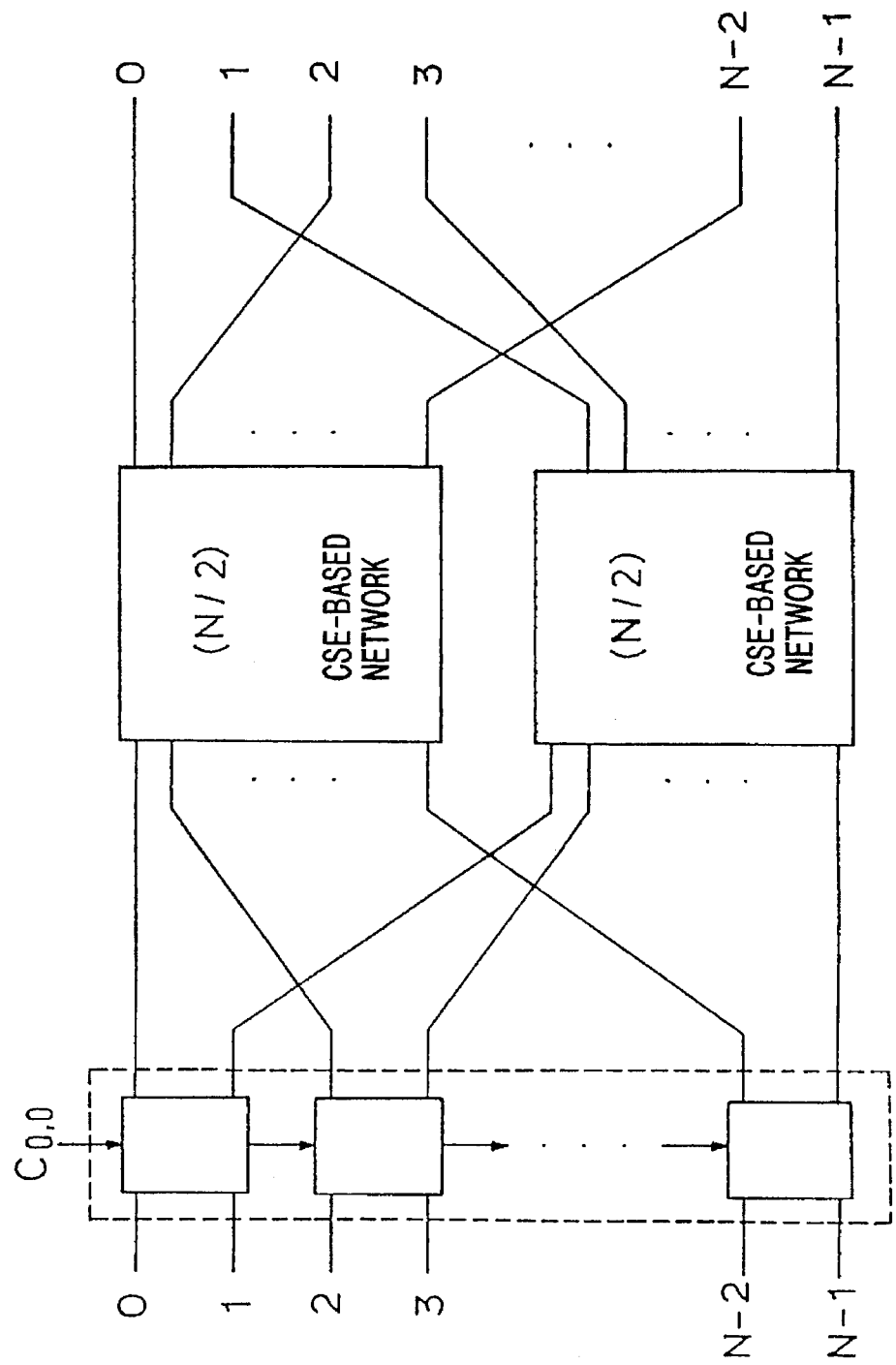
FIG. 6 is a structure diagram of a generalized CSE-based network according to the present invention.

<property 1> For CSE-based network according to the present invention shown in FIG. 6, the active input packets are alternately routed to the upper and the lower sub-network when the ECI $C_{0,0}=0$. Here, although the sub-network has the same construction as N/2 concentrator 12a, and 12b shown in FIG. 2, the signal applied to the ECI port of the switching element with 6 ports which is the construction element is not fixed 0, and the sub-network is the CSE to which an arbitrary logic value is applied. On the other hand, the input active packets are alternatively routed to the lower and the upper sub-networks when $C_{0,0}=1$. In all cases, the sequence between the active input packets is preserved.

That is, in case $C_{0,0}$ is 0, the front-side switching stage operates in the same manner as that for the iterative cell-based concentrator by Narasimha(refer to FIG. 2). That is, the input active packets are alternatively routed to the upper sub-network. Since the front-side switching stage can be considered one virtual active packet to be routed to the upper sub-network, the active input packets are alternately routed to the upper and the lower sub-network. Accordingly, while the even-sequenced active packets are routed to the upper sub-network in case $C_{0,0}$ is 0, the odd-sequenced active packets are routed to the upper sub-network in case $C_{0,0}$ is 1.

As a consequence of the property 1, we can know that $\lceil m/2 \rceil$ out of the m active input packets are routed to the upper sub-network and $\lfloor m/2 \rfloor$ are routed to the lower sub-network when $C_{0,0}=0$. Here, $\lceil \ \rceil$ denotes the largest integer smaller than or equal to the number within this bracket symbol, and $\lfloor \ \rfloor$ 540 the smallest integer larger than or equal to the number within this bracket symbol.

In the same manner, we know that $\lfloor m/2 \rfloor$ are routed to the upper sub-network and $\lceil m/2 \rceil$ are routed to the lower sub-network when $C_{0,0}=1$.

<property 2> When the active packets at the output stages of the CSE-based network which can be denoted as the output vector $O_{m,k}$ (m=1, 2, \ldots, N, k=0, 1, \ldots, N-1) exist, the even-sequenced active packets are connected to the upper sub-network, and the odd-sequenced active packets to the lower sub-network when k is even. Similarly, the odd sequenced active packets are connected to the upper sub-network, and the even-sequenced active packets to the lower sub-network when k is odd. In all cases, the sequence between the active packets is preserved.

That is, the final output of CSE-based network shown in FIG. 6 is alternately connected to the upper and the lower sub-network. Accordingly, the output lines of the upper sub-network is connected to the even-sequenced output line and the output lines of the lower sub-network to the odd-sequenced output line. Therefore, the property 2 is satisfied.

Consequently, from the above <property 2>, in case k is even, the $\lceil m/2 \rceil$ packets out of the m active output packets denoted as $O_{m,k}$ are connected to the upper sub-network in the form of $O_{\lceil m/2 \rceil, k/2}$, and the $\lfloor m/2 \rfloor$ packets are connected to the lower sub-network in the form of $O_{\lfloor m/2 \rfloor, k/2}$, similarly, in case k is odd, the $\lfloor m2 \rfloor$ packets are connected to the upper sub-network in the form of $O_{\lfloor m/2 \rfloor, k+\frac{1}{2} \bmod N/2}$, and the $\lceil m/2 \rceil$ packets are connected to the lower sub-network in the form of $O_{\lceil m/2 \rceil, (k-1)/2}$.

<property 3> For the CSE-based network, the unique assembly $\{(C_{0,0}), (C_{1,0}, C_{1,1}), \ldots, (C_{n-1,0}, C_{n-1,1}, \ldots, C_{n-1,2^{n-1}-1})\}$ (n=$\log_2 N$) of ECIs which connect to output vector $O_{m,k}$ (k=0, 1, ..., N-1) the arbitrary input vector consisted of the m(=1, 2, ..., N) active packets exists and the assembly is independent of the m.

The property 3 can be proved by the inductive method. When the CSE-based network is 2×2, it corresponds to tile one CSE. In this case, the available output vectors are $O_{1,0}$, $O_{1,1}$, $O_{2,0}$, and $0_{2,1}$. Among the four, two vectors $O_{1,0}$ and $O_{2,0}$, for which k=0, require $C_{i,j}$=0. Therefore, we can see that for the 2×2, the unique $\{((C_{i,j})\}$ exists, and the value is independent of the m. If this fact is applied to the N×N(N= $2^n$) distributor, there exists a unique assembly $\{(C_{n-1,0}, C_{n-1,1}, \ldots, C_{n-1,2^{n-1}-1})\}$ of all the ECIs of the last stage according to the respectively corresponding k values.

Now, we assume that the property holds for the 2×2 through the N/2×N/2 CSE-based network. In the respect of the N×N CSE-based network, this assumption implies that all the ECIs values $\{(C_{1,0}, C_{1,1}), \ldots, (C_{n-1,0}, C_{n-1,1}, \ldots, C_{n-1,2^{n-1}-1}\}$ of the upper and the lower sub-network are uniquely determined for the respective output vector. By setting $C_{0,0}$ to 0 by the property 1 in case k is even, the $\lceil m/2 \rceil$ and $\lfloor m/2 \rfloor$ out of the input active packets can be routed to the upper and the lower sub-network respectively, and the output vectors $O_{\lceil m/2 \rceil, k/2}$ and $O_{\lfloor m/2 \rfloor, k/2}$ of the respective sub-networks become the final output vector $O_{m,k}$ by the property 2. Accordingly, $C_{0,0}$ is uniquely determined to 0 in case k is even. Similarly, $C_{0,0}$ is uniquely determined to 1 in case k is odd.

The property shows that the ECI values of the CSE-based network are independent of the number of the input active packets, and dependent on only k. That is, the property implies that the CSE-based network can perform the same operation as the conventional distributor by selecting the proper ECI value at each time slot. Also, the property includes the method of determining the desired ECI values according to k. The method is as follows.

First, we select the output vector of a $O_{N/2,k}$ (k=0, 1, ..., N-1). Suppose that $C_{0,0}$ is set to 0 in case the starting point of group of 1 element of the vector is even, and $C_{0,0}$ is set to 1 in case the starting point is odd. Next, we respectively gather the odd-sequenced and the even-sequenced items of the output vector to make the two N/2 output vectors. We set $C_{1,0}$ and $C_{1,1}$ according to the starting point of the group of 1 element by the above method for the two output vectors. The ECI values of each vector are obtained by repeatedly performing the above method until the size of all the output vectors become 2.

For N=8, the below table 1 show the result of seeking the ECI values according to k through the method as stated above.

TABLE 1

The ECI values of the CSE-based distributor in the normal distribution mode (N = 8).

| register value | | | external control input (ECI) value | | | | | | |
|---|---|---|---|---|---|---|---|---|---|
| $k_2$ | $k_1$ | $k_0$ | $C_{0,0}$ | $C_{1,0}$ | $C_{1,1}$ | $C_{2,0}$ | $C_{2,1}$ | $C_{2,2}$ | $C_{2,3}$ |
| 0 | 0 | 0 | 0 | 0 | 0 | 0 | 0 | 0 | 0 |
| 0 | 0 | 1 | 1 | 1 | 0 | 1 | 0 | 0 | 0 |
| 0 | 1 | 0 | 0 | 1 | 1 | 1 | 0 | 1 | 0 |
| 0 | 1 | 1 | 1 | 0 | 1 | 1 | 1 | 1 | 0 |
| 1 | 0 | 0 | 0 | 0 | 0 | 1 | 1 | 1 | 1 |
| 1 | 0 | 1 | 1 | 1 | 0 | 0 | 1 | 1 | 1 |
| 1 | 1 | 0 | 0 | 1 | 1 | 0 | 1 | 0 | 1 |
| 1 | 1 | 1 | 1 | 0 | 1 | 0 | 0 | 0 | 1 |

Because the CSE-based network can make all the output patterns of the distributor, we can propose the structure of the distributor with a new pattern by making use of the property.

Figure 7:
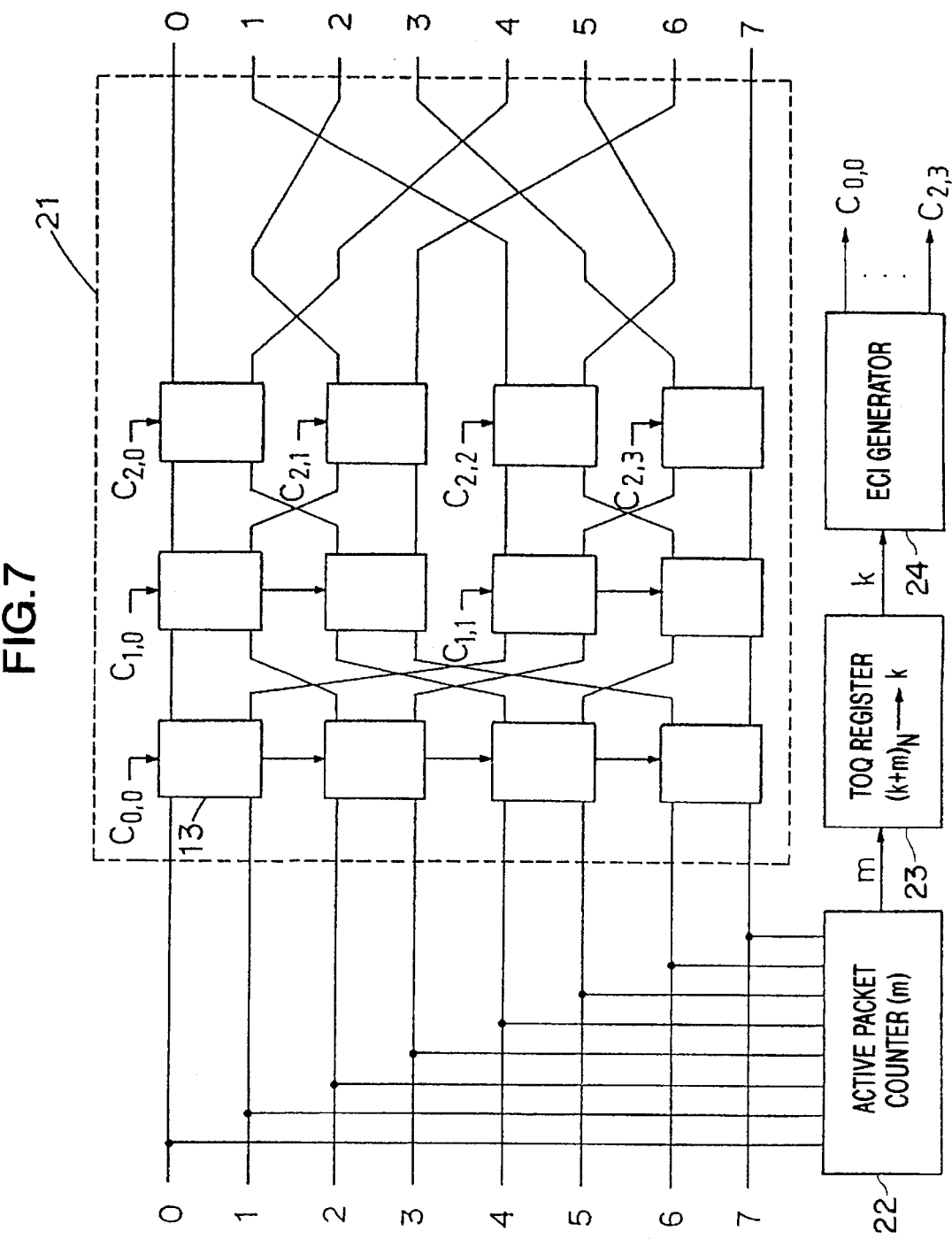
FIG. 7 is a structure diagram of an embodiment of a distributor according to the present invention.

FIG. 7 is a construction diagram of the distributor of one embodiment according to the present invention, and shows the construction in case the number of the input active packets are 8, in the drawing, 21 denotes the CSE-based network, 22 an active packet counter, 23 a TOQ register, 24 a ECI generator, respectively.

As shown in the drawing, the distributor according to one embodiment of the present invention comprises the CSE-based network 21 consisted of the $\log_2 N$ switching stages, each switching stage comprising the N/2 CSEs which comprise a control signal input stage and switch the two packet switching channels, the switching element group in the first switching stage from the output stage which receives the each unit control signal having $2^0$ switching elements as one unit, in the second switching stage from the output stage which receives the each unit control signal having $2^1$ switching elements as one unit, in the same manner, and in the last switching stage which receives the each unit control signal having $2^M$ (M being a natural number) switching elements as one unit, the active packet counter 22 connected for receiving the input active packet, the TOQ register 23 connected to the active packet counter 22, the ECI generator 24 which receives the value of the TOQ register to provide the ECI value to the switching element within the CSE-based network.

As shown in FIG. 4 CSE consisted of the each switching element group of the CSE-based network comprises the 2×2 switching element 17 which receives the two active packet signals and outputs them through the channel switching in response to the control signal, the Exclusive-OR element 16 receiving and modulo-summing the one of the active packet signals and the control signal which is independently applied by the switching element group and which provides its summed value as the control signal of the 2×2 switching element 17, the Exclusive-OR element 14 receiving and modulo-summing the two active packet signals and outputting its summed value, the Exclusive-OR element 15 receiving and modulo-summing the output of the Exclusive-OR element 14 and the control signal which is independently applied by the group of the switching element, output its summed value as the control signal of the adjacent CSE.

The operation of the distributor Of which is composed as stated above will be explained below.

The TOQ register 23 stores the value k of the output vector to which the active input packets will be mapping. This role is identical with the role of the TOQ register of the conventional distributor(refer to FIG. 1). The value of the TOQ register is inputted to the ECI generator 24 at each time slot, the role of the ECI generator 24 is to generate the values of the ECI corresponding to the value k of the TOQ register 23.

Because the value k is 0 in case all buffer are empty, the outputs of the ECI generator 24 become all 0. Subsequently, in case the m active packets arrive, these packets are transmitted from 0 to m−1 of the output port through the CSE-based network 21. And then, the active packet counter 22 which is parallely connected to the front stage input of the CSE-based network 21 in parallel counts the number of the active input packet and provides the counted value with the TOQ register 23 in order to update the value of the TOQ register 23 through the operation of the modulo-N.

Figure 8:
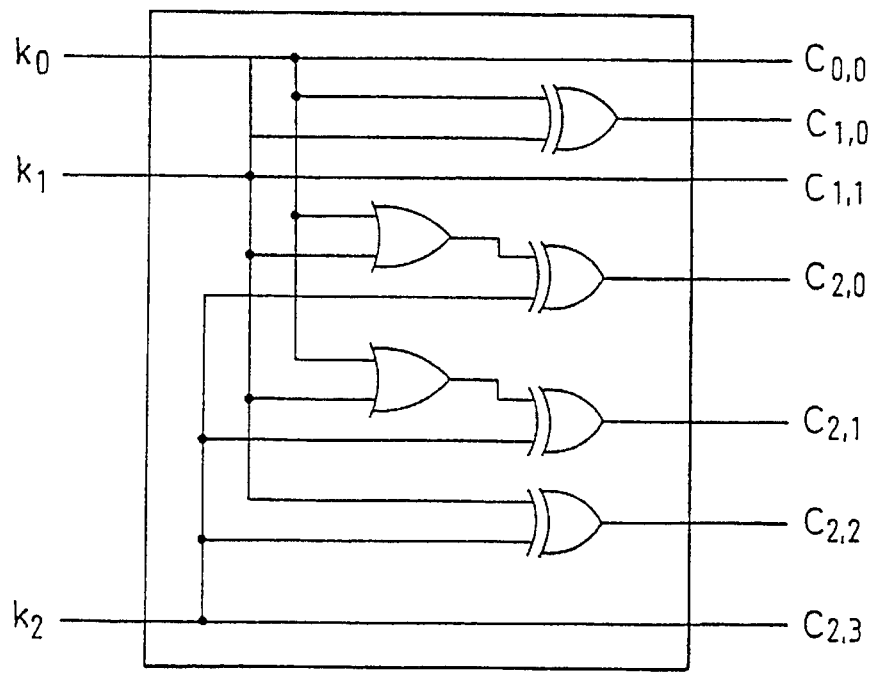
FIG. 8 is a logic circuit diagram of an embodiment of a ECI generator.
Figure 9:
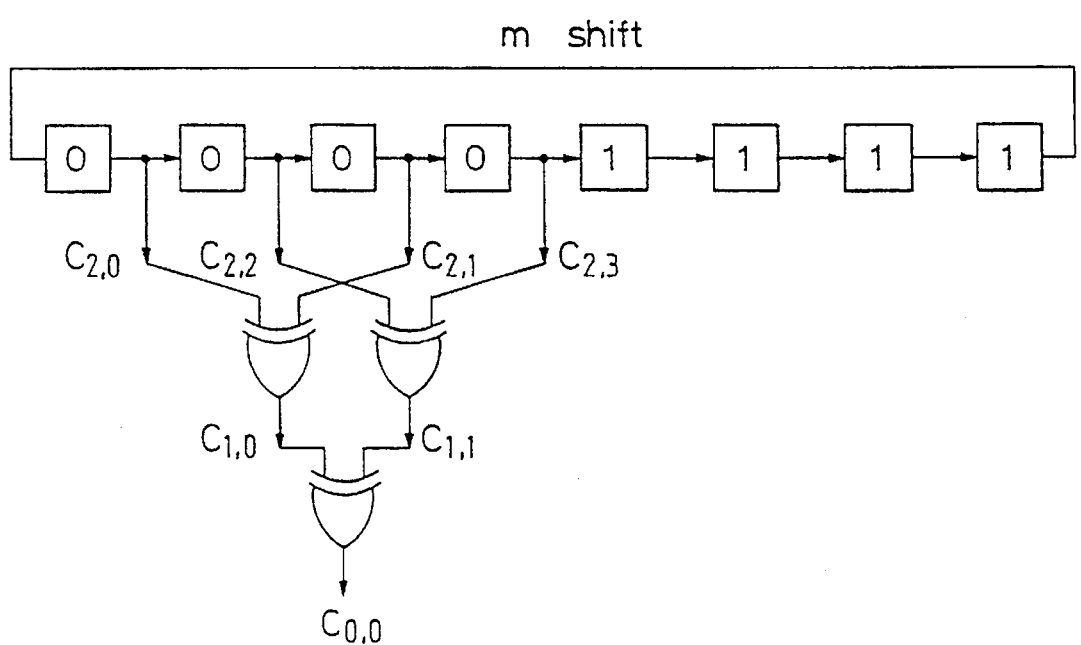
FIG. 9 is a logic circuit diagram of other embodiment of the ECI generator.

The ECI generator 24 can be consisted of a variety of methods. The first method is the composition of storing the ECI values according to the value k in memory in advance, the second method is the composition of using only logic elements as illustrated in FIG. 8. As the third method is the composition of using the only flip-flops and the XOR gate as shown in FIG. 9, this method does not need the TOQ register because of transmitting the values stored in the flip-flop as many as the outputs of the active packet counter 22 to the adjacent flip-flop.

The methods stated above can be selectively used according to the use object of the proposed distributor of the present invention, and the detailed description will be explained below.

The output patterns of the distributor stated above rightly preserve the sequence between the active packets.

However, on the contrary, the distributor with the pattern in which the sequence between the active packets is reversely preserved is sometimes required.

For the convenience of explanation, let us set that the above stated distributor operates in a normal distribution mode, the distributor described later does in a reversed distribution mode.

As is the case with the distributor in the normal distribution mode, each output of the distributor in reversed distribution mode can be denoted in the vector form of $\hat{O}_{m,\hat{k}}$ (m=0, 1, ..., N, $\hat{k}$=0, 1, ..., N−1). Here, m denotes the number of the group of 1 elements in the vector, $\hat{k}$ indicates the ending point of the group of 1 elements.

But, the value $\hat{k}$ can be used for indicating the buffer which stores the first active packet arriving in the next time slot as the distributor operating in normal distribution mode. In this respects, the register which stores the value $\hat{k}$ is called a HOQ(head of queue), and note that the value of the HOQ register is updated in the direction of being decreased as many as the number of the input active packets because the distribution in the reversed distribution mode reversely concentrates the active packets.

The next property represents the relationship between the respective ECI values of the distributor operating in the normal distribution mode and in the reversed distribution mode.

<property 4> When $\{(C_{0,0})\ (C_{1,0},\ C_{1,1}),\ \ldots,\ (C_{n-1,0},\ C_{n-1,1}, \ldots, C_{n-1,2^{n-1}-1})\}$ is the set of the ECI values in case the value of the TOQ register of the distributor operating in the normal distribution mode is k, $\{\overline{(C_{0,0})},\ (\overline{C_{1,1}},\ \overline{C_{1,0}}),\ \ldots, (\overline{C_{n-1,2^{n-1}-1}},\ \overline{C_{n-1,2^{n-1}-2}},\ \ldots,\ \overline{C_{N-1,0}})\}$ is the set of the ECI values in case the value k of the HOQ register of the distributor operating in the reversed distribution mode is N−1−k.

The property above means that if $\{(C_{0,0})\ (C_{1,0},\ C_{1,1}),\ \ldots,\ (C_{n-1,0},\ C_{n-1,1}, \ldots, C_{n-1,2^{n-1}-1})\}$ is the set of the ECI values which makes the arbitrary input vector of the distributor operating in the normal distribution mode mapped into the output vector $O_{m,k}$, $\{\overline{(C_{0,0})},\ (\overline{C_{1,1}},\ \overline{C_{1,0}}),\ \ldots, \overline{C_{n-1,2^{n-1}-1}},\ \overline{C_{n-1,2^{n-1}-2}},\ \ldots,\ \overline{C_{N-1,0}}\}$ becomes the ECI values which makes the arbitrary input vector of the distributor operating in the reversed distribution mode mapped into the output vector $\hat{O}_{m,\hat{k}}$.

For the 2×2 CSE-based network, the output vectors of the distribution operating in the normal distribution mode are $O_{1,0},\ O_{1,1},\ O_{2,0},\ O_{2,1}$. Among the four, the two output vectors $O_{1,0},\ O_{2,0}$ require the ECI value $C_{i,j}$ to be 0. If we invert the ECI value, or set $c_{i,j}$=1, then the corresponding output vectors become $O_{1,1}$, and $O_{2,1}$, which are identical with $\hat{O}_{1,1}$, $\hat{O}_{2,1}$. Consequently, this proves that the property holds the 2×2 distributor case.

By dividing the arbitrary output vector $O_{m,k}$ of the N×N CSE-based network into the output of each sub-network, we set the output of the upper sub-network is $O_u$ and the output of the lower sub-network is $O_L$. Now, we assume that the property holds for the distributor sized 2×2 through N/2× N/2. For the output vector of each sub-network, this assumption implies that by changing the ECI values as stated above, we can get the output vector with the pattern in which the output vector is turned upside down.

Now, let us divide the output vector $\hat{O}_{m,\hat{k}}$ with pattern in which the output vector $O_{m,k}$ is turned upside down into the output of each sub-network. Then, we can easily notice that the output of the upper sub-network has the pattern in which the $O_L$ is turned upside down and the output of the lower sub-network has the pattern in which the $O_u$ is turned upside down. When the value k is even(odd), all the even(odd)-sequenced active input packets are transmitted to the output port through the upper sub-network in case $C_{0,0}$ is 0 for <property 1> and <property 2>. Therefore, in case the value $C_{0,0}$ is changed to $\hat{C}_{0,0}$, all the even(odd)-sequenced active input packets are outputted to the output port through the lower sub-network.

The following table 2 lists the ECI values obtained according to $\hat{k}$ based on the above properties in case N is 8.

TABLE 2

Setting of the ECIs of the CSE-based distributor in the reversed distribution mode (N = 8)

| register value | | | external control input (ECI) value | | | | | | |
|---|---|---|---|---|---|---|---|---|---|
| $\hat{k}_2$ | $\hat{k}_1$ | $\hat{k}_0$ | $C_{0,0}$ | $C_{1,0}$ | $C_{1,1}$ | $C_{2,0}$ | $C_{2,1}$ | $C_{2,2}$ | $C_{2,3}$ |
| 0 | 0 | 0 | 0 | 0 | 1 | 0 | 1 | 1 | 1 |
| 0 | 0 | 1 | 1 | 0 | 0 | 0 | 1 | 0 | 1 |
| 0 | 1 | 0 | 0 | 1 | 0 | 0 | 0 | 0 | 1 |
| 0 | 1 | 1 | 1 | 1 | 0 | 0 | 0 | 0 | 0 |
| 1 | 0 | 0 | 0 | 0 | 1 | 1 | 0 | 0 | 0 |
| 1 | 0 | 1 | 1 | 0 | 0 | 1 | 0 | 1 | 0 |
| 1 | 1 | 0 | 0 | 1 | 0 | 1 | 1 | 1 | 0 |
| 1 | 1 | 1 | 1 | 1 | 1 | 1 | 1 | 1 | 1 |

Accordingly, CSE-based network is operated in the reversed distribution mode in the case of using ECI generator generating ECI value as representing the above table 2 according to HOQ register value as the normal distribution mode.

The distributor according to one embodiment of the present invention shown in FIG. 7 can make a correct ECI value by using the active packet counter 22 and ECI generator 24. However, further simplified distributor can be constructed by using the properties of CSE-based network will explained later.

To easily explain, suppose that switching element in CSE-based network interconnecting control lines contains the same switching element group. Accordingly, ith stage consist of $2^{i-1}$ switching element groups.

<property 5> suppose that the register value of CSE-based network is k (=0, 1, ..., N-1), and m(=1, 2, ..., N) active packets is inputted. And then, after these packets pass through CSE-based network, the control output port values of the lowest switching element of each switching element group are equal to the outputs of ECI generator in case TOQ register value is k+m mod N. First, the operation of tile first stage of CSE-based network is explained below. To easily explain, the lowest packet among the inputted m active packets is inputted through ith input port, we call this packet a test packet. Sub-network to which the test packet is transferred is determined by $C_{0,0}$ and the number of active packets inputted from the input port from 0 to i−1th. That is, if upper value is even(odd), this test packet is transferred to the upper(lower) sub-network.

Now, suppose that the test packet is changed to the inactive packet. Then, the control output stage value of the lowest switching element of the first stage is to be equal to the above obtained value. This fact can be adapted to all switching element groups that the test packet pass. Since the sequence between the active packets is always preserved in CSE-based network according to <property 1>. Accordingly, after the test packet is changed to non-active packet, ECI value changes into the final control output line value of each switching element group.

Accordingly, in case after the test packet changes into the inactive packets and the ECI value changes into the final control output line value of each switching element group, the test packet is transferred to the correct output port. Also, after the test packet is transferred, the final control output port value of each switching element group can be transferred to correct output port, that is, k+m mod N, in case the one active packet is again inputted during the next time slot.

Figure 10:
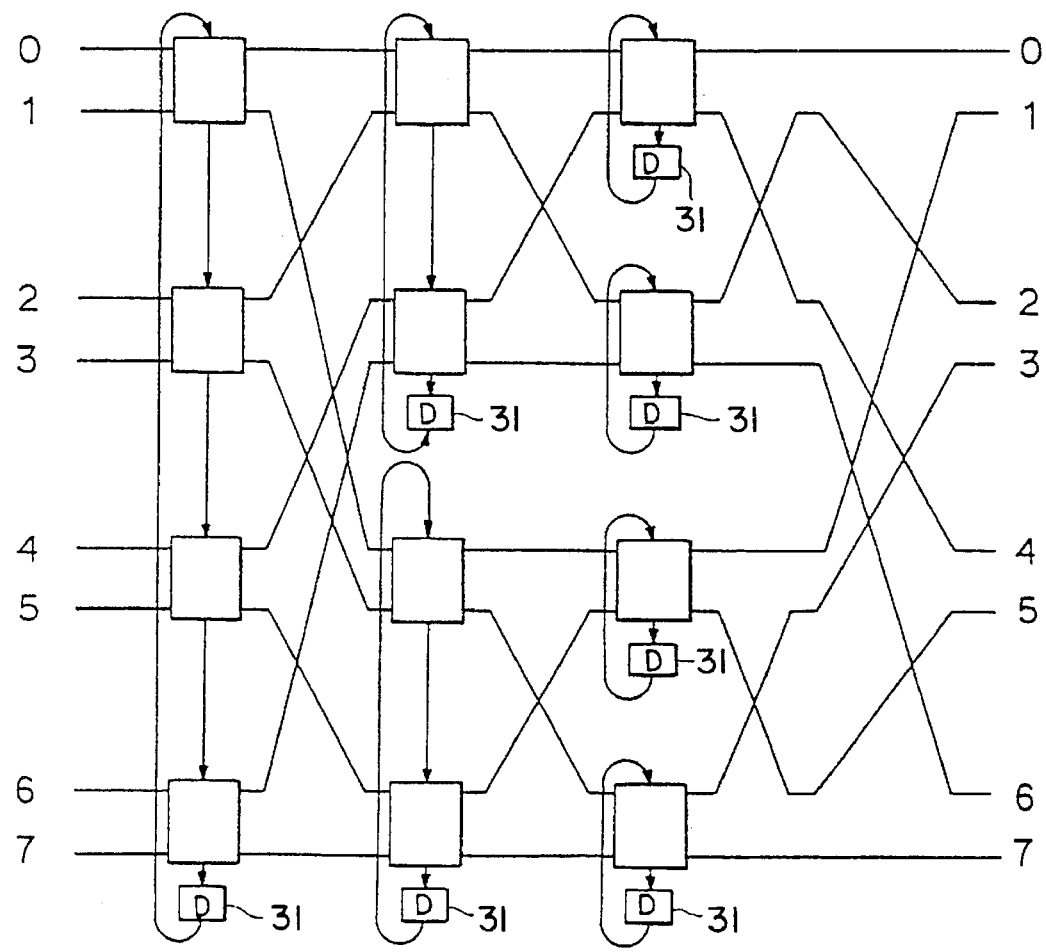
FIG. 10 is a structure diagram of other embodiment of the distributor according to the present invention.

From the above description, in case if m' active packets arrive during the next time slot, we can notice that ith active packet is transferred to the output port k+m+i−1 nod N by repeating the above steps after all the active packets change the inactive packets except the only i(=1, 2, ..., m')th active packet from the top. However, since the above step simultaneously occurs in CSE-based network, the final control output port value of each switching element group of previous time slot is equal to the register value of k+m mod N case by unity property of ECI value of <property 3>. By using the above <property 5>, we can implement further simplified distributor, it is shown in FIG. 10. FIG. 10 shows a construction diagram of the distributor according to other embodiment of the present invention, 31 illustrates delay device in FIG. 10.

As shown in drawing, the distributor according to other embodiment of the present invention comprises the CSE-based network 21 consisted of the $\log_2 N$ switching stages, each switching stage comprising the N/2 CSEs which comprise a control signal input stage and switch the two packet switching channels, the switching element group in the first switching stage from the output stage which receives the each unit control signal having $2^0$ switching elements as one unit, in the second switching stage from the output stage which receives the each unit control signal having $2^1$ switching elements as one unit, in the same manner, and in the last switching stage which receives the each unit control signal having $2^M$ (M being a natural number) switching elements as one unit, delay element 31 delaying in order to use the final control output port value as ECI value of the next time slot, and providing its delay signal to ECI input port of CSE first receiving ECI value in corresponding group.

In FIG. 10, the connection state of each switching element containing to the same switching element group is sequentially determined. That is, after all state of the switching elements locating upward of each switching element is determined the connection state itself can be determined. Accordingly, in case the size of the distributor is large, the above construction spends much time in determining all the connection state of the switching elements. Consequently, it has a problem that the size of the distributor is limited. This problem is solved by transforming the CSE-based network into a parallel processing CSE-based network so that a decision of the connection state of each switching element is performed by a parallel processing.

The parallel processing CSE-based network can be constructed as follows.

Figure 11C:
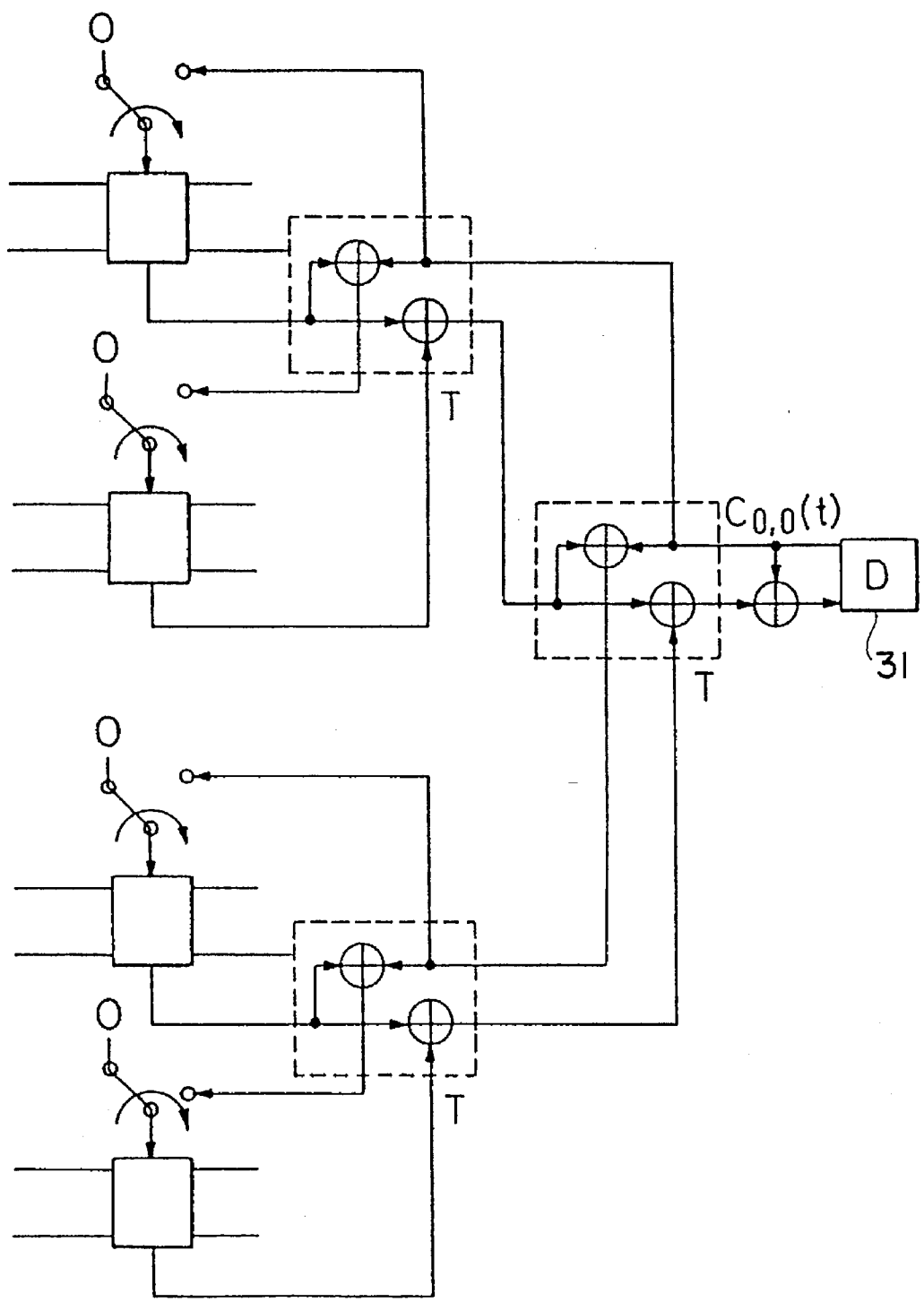

FIGS. 11A to 11C illustrate an exemplary structure according to change to parallel processing CSE-based network.

FIG. 11A shows the first stage of 8×8 sized CSE-based network in the case of change to the parallel processing CSE-based network. The current ECI value of this stage is $C_{0,0}(t)$. This stage can be divided by two groups as shown in FIG. 11B. The operation of these groups can be explained by dividing into two phases. First phase is to find the number of active packets arriving the input port of each group. We can know the number of the active packets from the final control output port value, suppose that ECI value is 0. Second phase is to perform function determining the connection state of each switching element by allowing sum of $C_{0,0}(t)$ in responding to the upper group, and $C_{0,0}(t)$ in responding to the lower group and the number of the active packets obtained in the first phase to ECI value. Accordingly, the connection state of each switching element determined by these ECI values is always equal to the connection state of each switching element shown in FIG. 11A.

Also, second phase is to obtain new ECI value $C_{0,0}(t+1)$ which will be used during the next time slot. This value is sum of $C_{0,0}(t)$ and the number of the active packet of each group obtained in first phase. The above phase can be adapted to each group repeatedly. FIG. 11C shows the result adapting the above phase with respect to each group. The above phase can be adapted to the rest of stages in the same manner. FIG. 12 is a structure diagram of the distributor according to the final result.

Figure 12A:
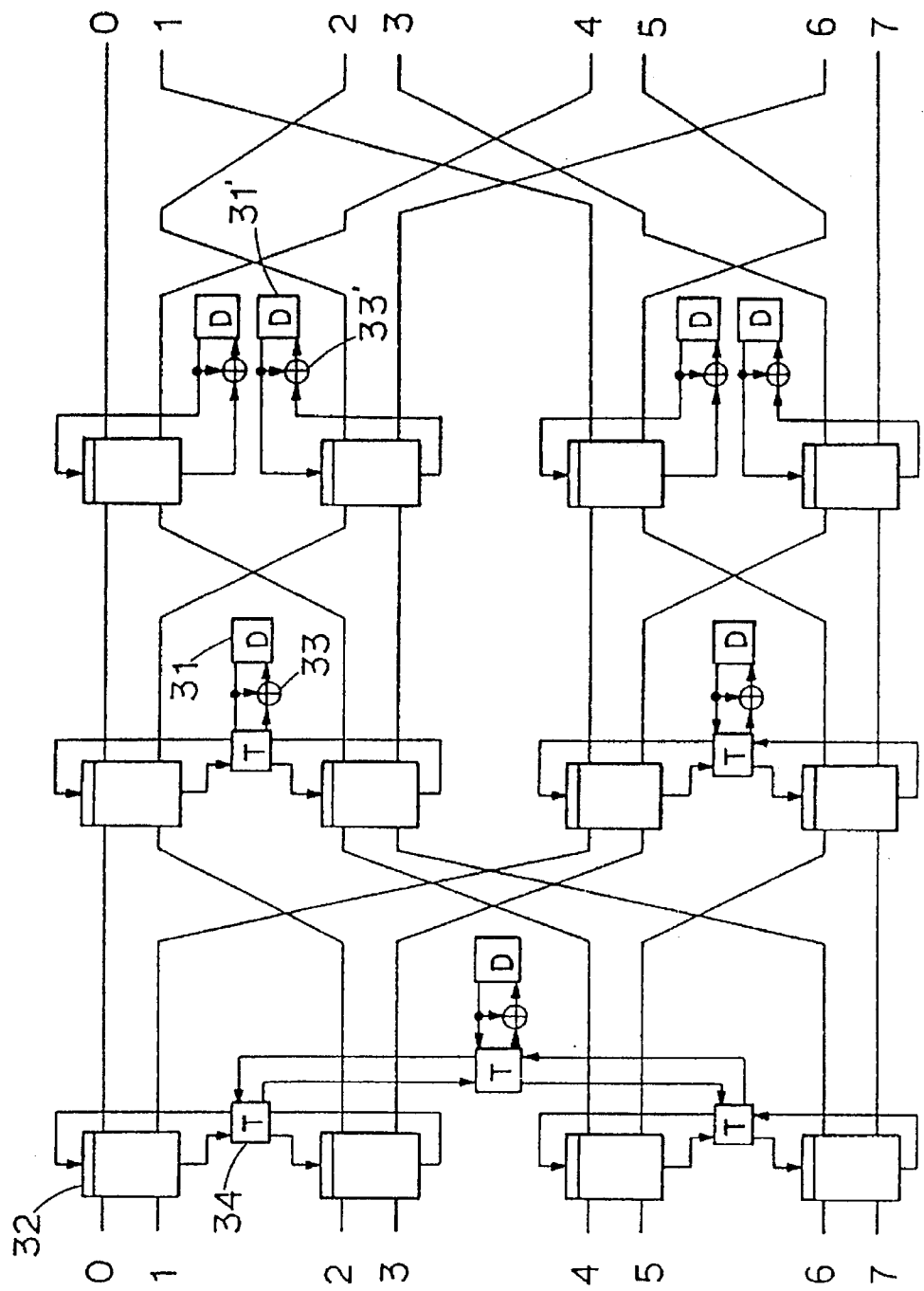
FIG. 12A is a structure diagram of another embodiment of the distributor according to the present invention.
Figure 12B:
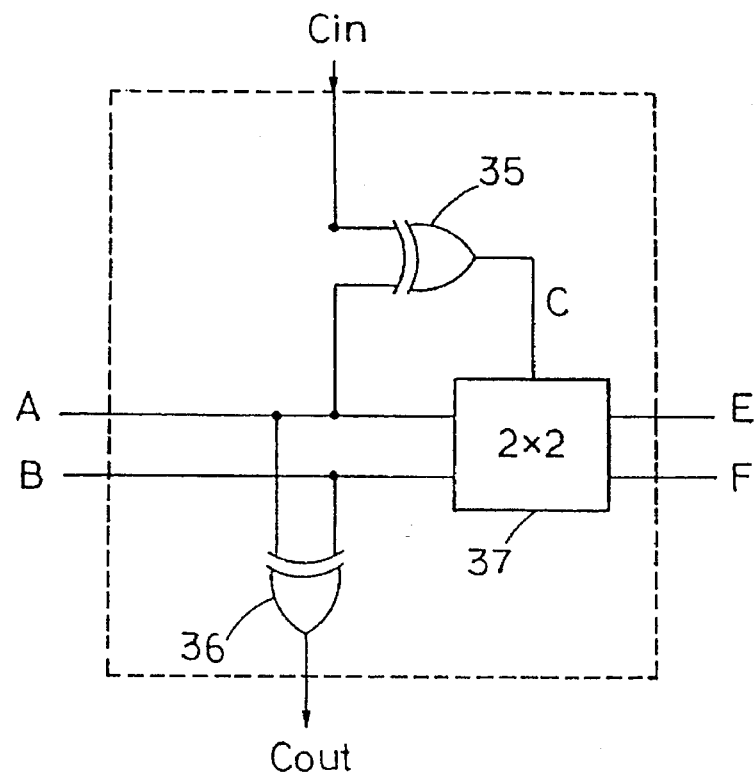
FIG. 12B–12C is a structure diagram of a CSE and a controller according to other embodiment of the present invention.

FIG. 12A is a structure diagram of the distributor according to another embodiment of the present invention, and specially, a structure diagram of the distributor adapting the 8×8 sized parallel processing CSE-based network. FIG. 12B shows an internal structure of the parallel processing controlled switching element, FIG. 12C shows an internal structure of controller, in the drawing, 32 denotes parallel processing controlled switching element, 33 designates summing adder, 34 designates controller.

The distributor of other embodiment according to the present invention as shown in drawings, comprises the CSE-based network 21 consisted of the $\log_2 N$ switching stages, each switching stage comprising the N/2 parallel processing controlled CSEs which comprise a control signal input stage and switch the two packet switching channels, the switching element group in the first switching stage from the output stage which receives the each unit control signal having 2⁰ parallel processing controlled switching elements as one unit, in the second switching stage from the output stage which receives the each unit control signal having $2^1$ parallel processing controlled switching elements as one unit, in the same manner, and in the last switching stage which receives the each unit control signal having $2^M$(M being a natural number) parallel processing controlled switching elements as one unit, first summing adder 33' is constructed in each switching element groups consisting of one parallel processing CSE 32 among the switching element groups and summing the control input port signal and control output port signal of the parallel processing CSE, first delay element 31' delaying the output signal of the summing adder and providing the delayed signal as the control input port signal of the parallel processing CSE, a first parallel processing controller(T:34) is constructed in each switching element groups consisted of more than two parallel processing controlled switching elements among the switching element groups, between a pair of upper and lower parallel processing controlled switching elements in the switching element groups, and generating and providing the corresponding parallel processing control signal to a distinct parallel processing controlled switching element, a second parallel processing controller controlling the first parallel processing controller, and a third to a $\log_2 N-1$ parallel processing controller controlling a parallel processing controller which is constructed like the construction of the second parallel processing controller, second summing adder 33 for summing and outputting one output and input signals of the final parallel processing controller, second delay element 31 delaying the output signal of the second summing adder 33 and providing its delayed signal as one input of the final parallel processing controller in the each switching element group.

And, the parallel processing controlled switching element 32 in each switching element group as shown in FIG. 12B comprises 2×2 switching element 37 inputting two active packet signals and outputting the two active packet signals A, and B to the next switching stage by switching channel according to the control signal, Exclusive-OR element 36 for modulo-summing the input active packet signals and providing its summed value as the parallel processing control output port signal, Exclusive-OR element 35 for modulo-summing one signal among the input active packet signals and the control signal inputted to the parallel processing control input port, and providing its summed value as the control signal of the 2×2 switching element.

Figure 12C:
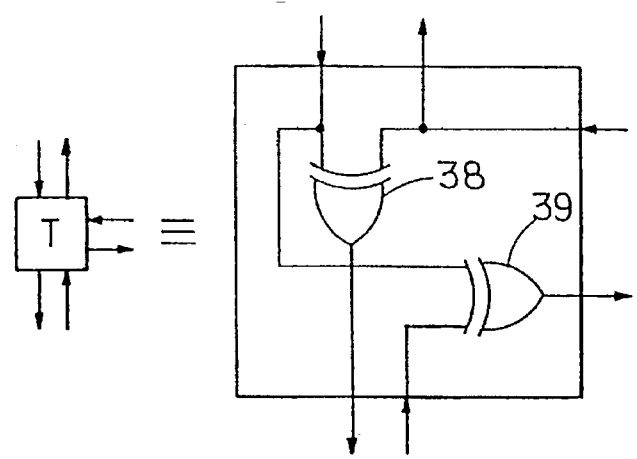

Also, the respective first to log N–1 parallel processing controller as shown in FIG. 12C comprises Exclusive-OR element 38 for modulo-summing the signal of the control signal output port of the one controlled switching element among the district two parallel processing controlled switching elements and the control signal inputted to the control signal input port provided from the delay element 31, and providing its summed signal to the control signal input port of the other controlled switching element among district two parallel processing control switching elements, Exclusive-OR element 39 for modulo-summing the signals of the control signal output port of one and the other CSE among the district two parallel processing CSEs and providing its summed signal as one input signal of the summing adder 33.

Now, Let's compare the required delay time for determining the connection state of the switching elements of the first stage of the N×N sized distributor of other embodiment of the present invention as shown in FIG. 10 and the first stage of the distributor of another embodiment as shown in FIG. 12A.

In the distributor structure according to the other embodiment, the required delay time of first stage becomes (N–1) τ since the connection state of the most downward switching element is the last(here, τ is a delay time of one Exclusive-OR element). On the other hand, the required total delay time of the distributor structure according to another embodiment becomes $(2\log_2 N-1)\tau$. Accordingly, we can notice that the maximum size being capable of implementing by the distributor of another embodiment is larger than that of the other embodiment.

The distributor according to the present invention constructed as the above stated can be used for achieving properties of a various types. Specific application example and representative applied example of the proposed distributor will be explained below.

The distributor is largely used for three purposes. First, it is used for efficiently utilizing buffer. Second, it is used for the structure of the internal-queueing fast packet switch. Third, it is used for the structure of multi-channel fast packet which preserves the sequence between packets. Next, the application of the distributor according to the present invention are as follows.

Figure 13A:
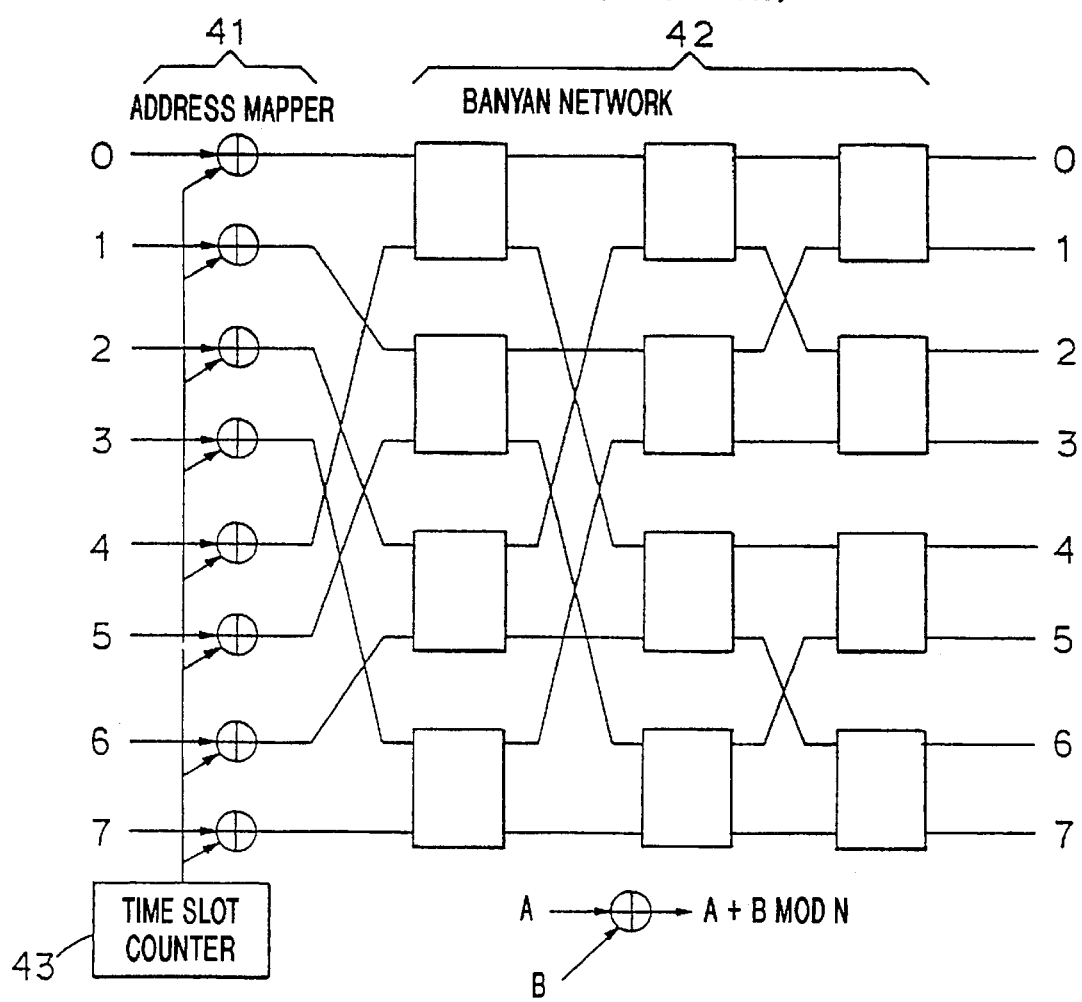

1. Application to shift-sequence Permutation network SSP network is to solve unfairness problem generated in nonblocking copy network offered by T. T. Lee. Function of the network is to connect each input ports to the output ports by rotating the input ports at time slot. That is, when time slot is k, the input port i(=0, 1, ..., N–1) is mapped to the output port i+k mod N. Therefore, each input port of the SSP network will get an equal opportunity in accessing the nonblocking copy network on a time-averaging basis. FIG. 13A is a structure diagram of a general SSP network, SSP network consists of an address mapper 41, a banyan network 42, and a time slot counter 43.

Time slot counter 43 counts 0, 1, ..., N–1 sequentially as modulo-N counter and transfer the counted value to address mapper 41. Address mapper 41 is constituted by N modulo-N summing adders, each summing adder appends a dummy header having i+k mod N value to packet of input port i2 (here, k is an output value of the time slot counter). Hence, the distributor according to the present invention can operate as SSP network by its slightly transformation. First, every input packets are considered as active packets, and active packet counter and register are omitted. Instead of that, ECI generator as embodiment shown in FIG. 9 can be constructed. At this time, ECI generator makes each flip-flop value to be rotated at each time slot to the righthand side by one times. FIG. 13B illustrates the structure of the ECI generator, in the drawing, 44 denotes a TOQ register, 45 a ECI generator having the structure as shown in FIG. 9.

2. Application to N×R(R<N) concentrator

Figure 14A:
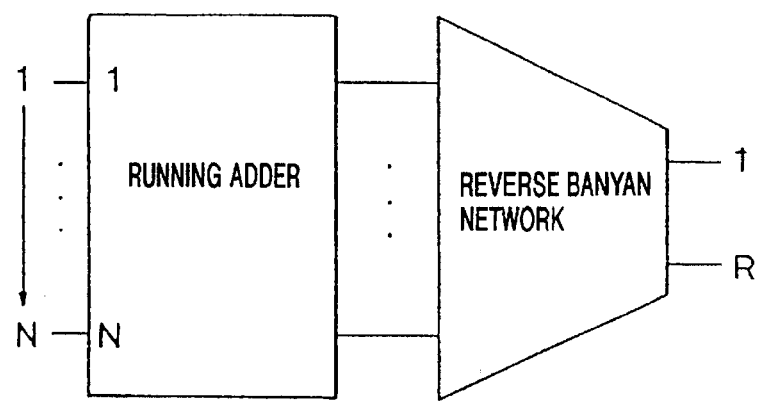

Generally, concentrator is used for connecting N(=$2^n$) inputs to R(=$2^r$<N) outputs. This N×R concentrator can be implemented by eliminating the switching element and connecting lines not to be used in N×N concentrator as shown in FIG. 14A. However, this method can not decrease the size of the running adder and also the switching element.

Figure 14B:
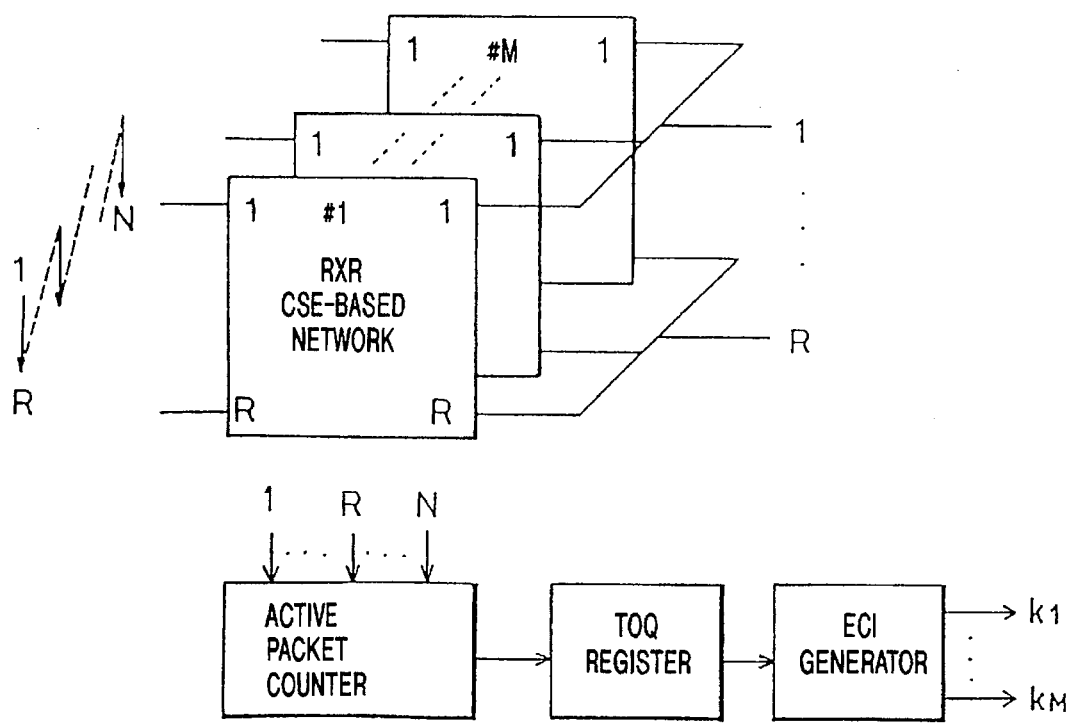

N×R concentrator can be implemented by connecting M R×R sized distributor as shown in FIG. 14B. At this time, ECI values of the first distributor are fixed to all 0, the final control output port value of each switching element group of the first distributor is used as ECI value of second distributor. The rest of distributor is connected to one another in the same manner. That is control output port value of i(=1, 2, ..., M–1)th distributor is used as ECI value of i+1th distributor.

Figure 15A:
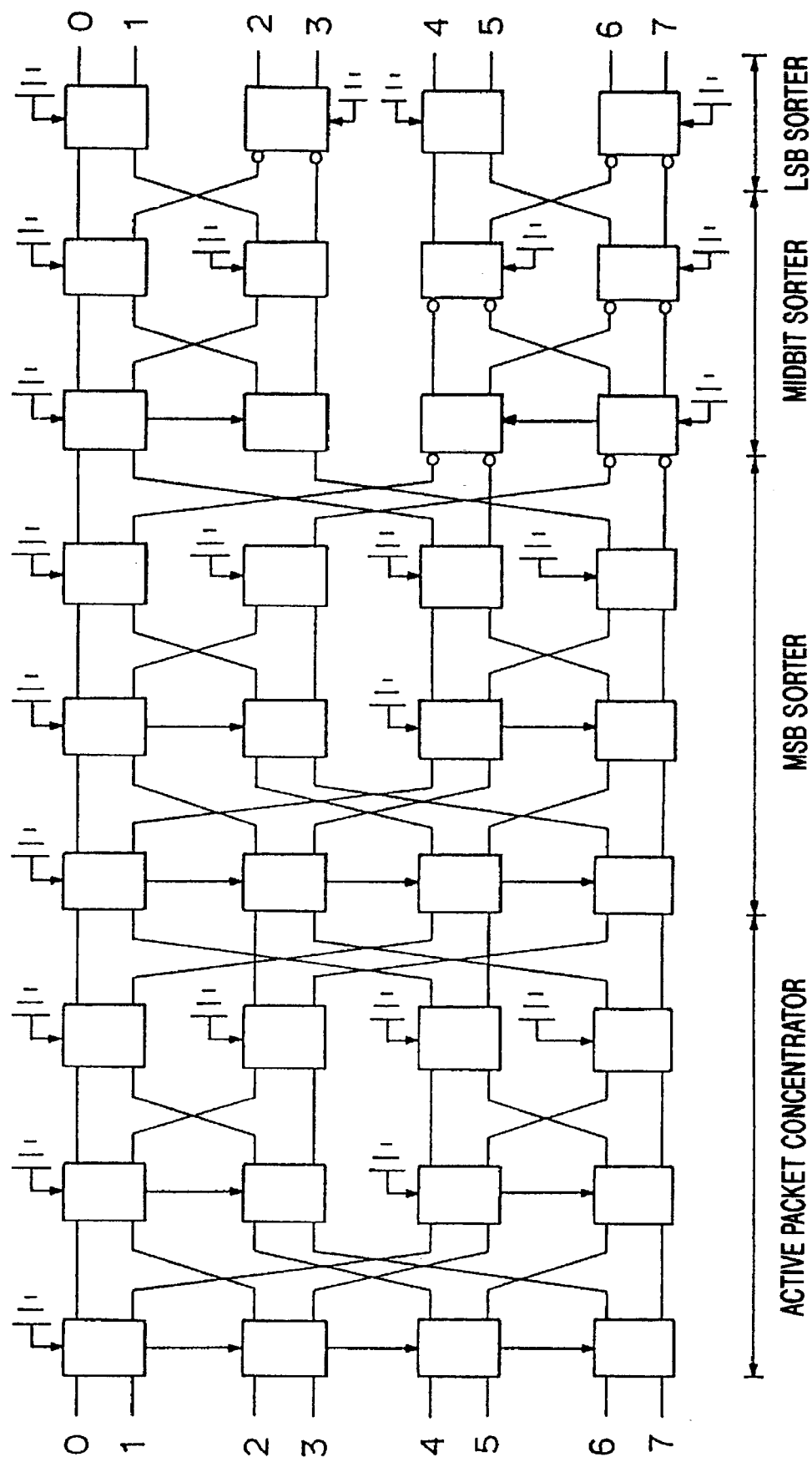

3. Application to nonblocking point-to-point fast packet switch Narasimha proved that the nonblocking point-topoint fast packet switch can be constructed by using an iterative cell-based concentrator. This switch is a type connecting a binary radix storing network and a concentrator as shown in FIG. 15A. The concentrator of previous stage plays a role of concentrating active input packets to upward output ports. The binary radix storing network is consisted of $N(=\log_2 N)$ stage sorter from MSB sorting network to LSB sorting network, each sorting networks concentrate input packets by using corresponding address bit as active bit.

Figure 15B:
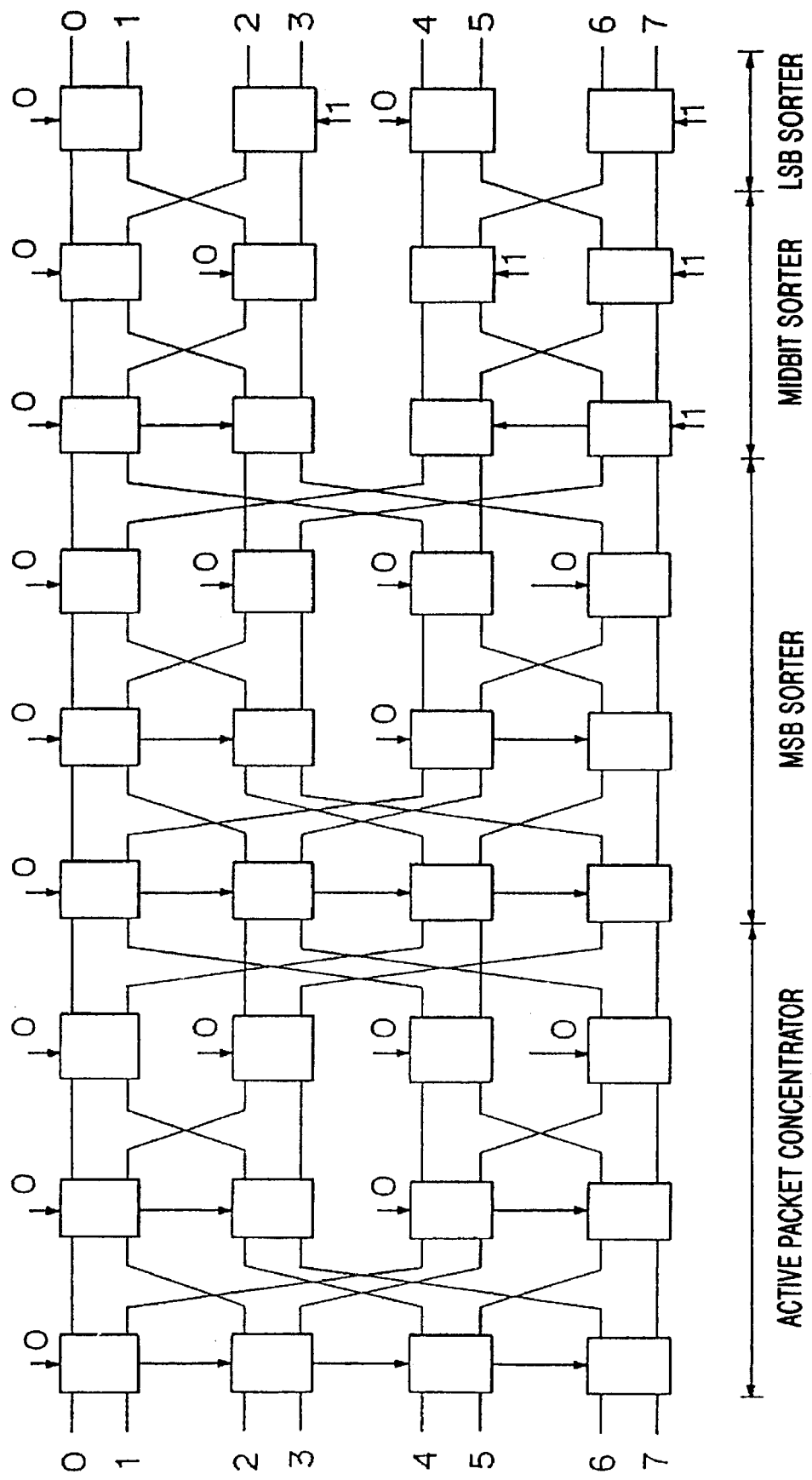

Using CSE-based network according to the present invention, the nonblocking point-to-point fast packet switch as shown in FIG. 15B is obtained. This structure is to make ECI value of mid bit sorter and LSB sorter to be 1, is different from that shown i FIG. 15A. That is, by making ECI value to be 1, logic not gate of input stage of the above structure can be eliminated.

Figure 16A:
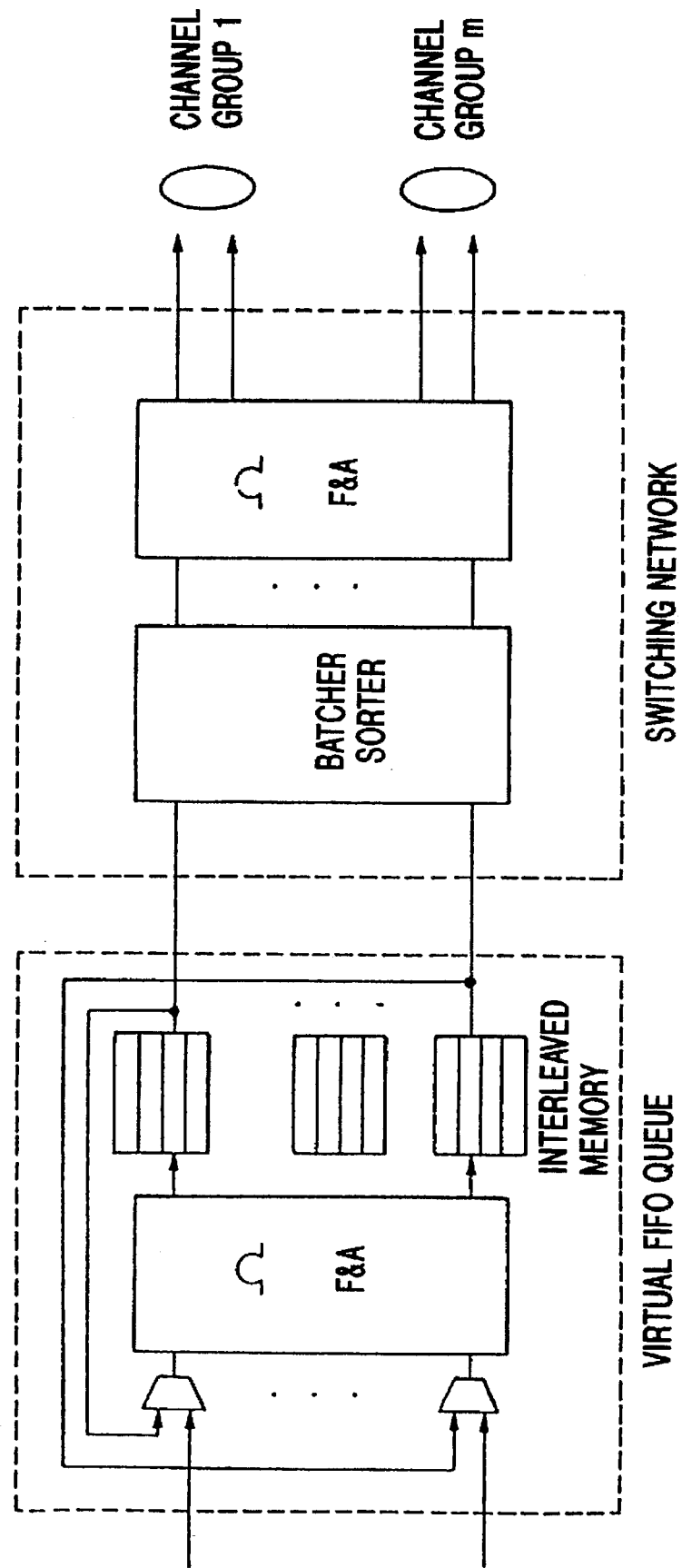

4. Application to virtual FIFO queue Since packets containing to the same connection can be transferred to adjacent switch through channel one another, in, multi-channel fast packet switching system, the problem preserving sequence of these packets is occurred. Lately, multi-channel fast packet switch structure which preserves the sequence of the packets is offered. This structure is consisted of a virtual FIFO queue and switching network as shown in FIG. 16A. Among this, previous virtual FIFO queue performs an important function in preserving the sequence of packets.

The virtual FIFO queue preserves the sequence between the packets fedback from input packet and switching network by using two pointer.

Figure 16B:
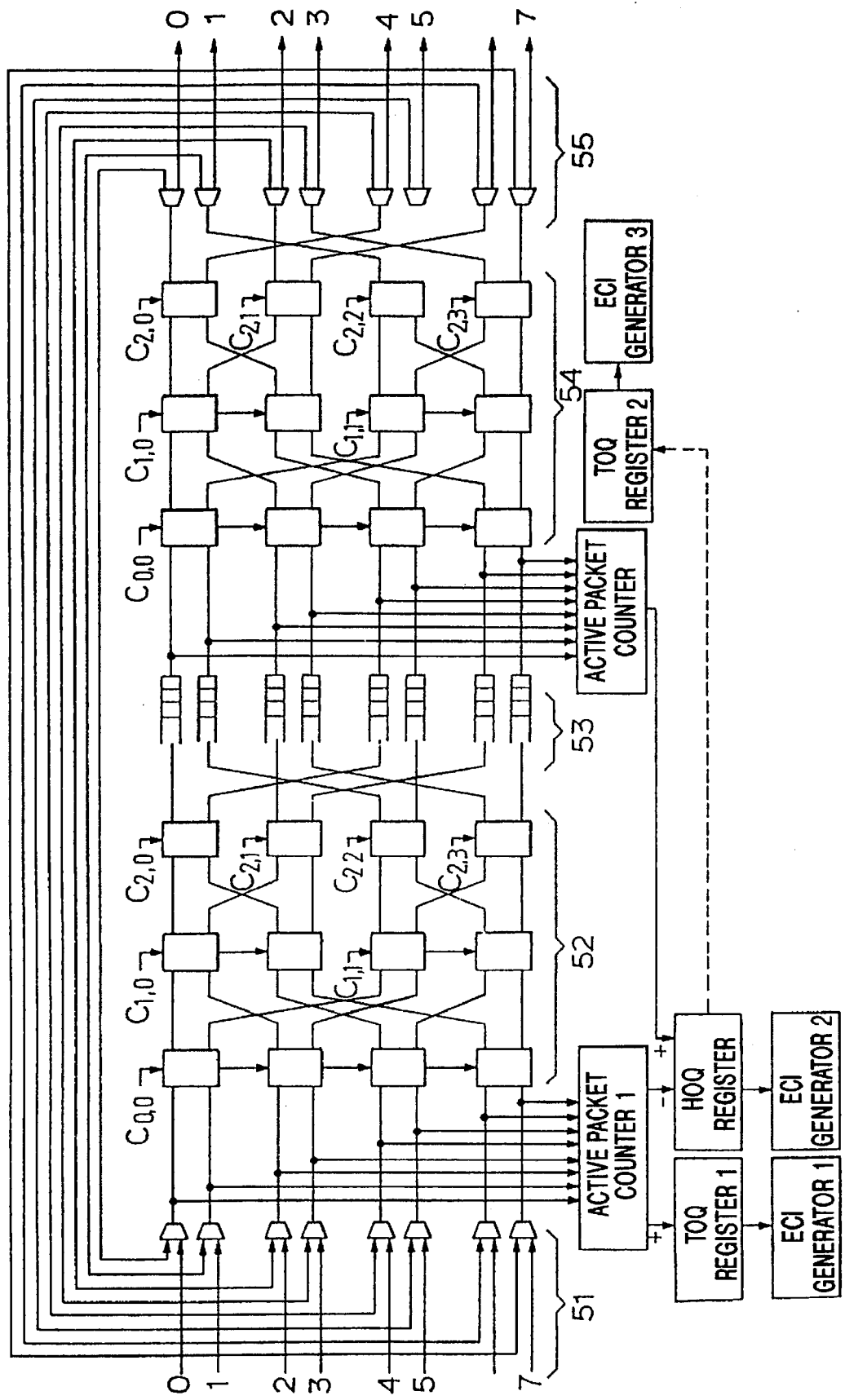

FIG. 16B is a structure diagram of virtual FIFO queue of a new type using CSE-based network according to the present invention. virtual FIFO queue comprises input selector 51, two CSE-based distributor 52, and 54, buffer block 53, and output selector 55.

Previous CSE-based distributor 52 alternatively functions as the normal distribution mode and the reversed distribution mode. On the other hand, next distributor 54 circulates packets outputted from buffer block 53 for preserving sequence between the packets. These two distributors performs operation by referring TOQ1 and HOQ register values. At this time, TOQ1 register value K1 indicates buffer being ready to receive first active packet inputted during the next time slot. That is, the value k indicates downward of buffer in which the most next input packet is stored. On the other hand, HOQ register value k indicates upward of buffer in which the most first input packet is stored.

First step, input active packets are stored in buffer block 53 through previous distributor 52. At this time, distributor 52 performs operation of the normal distribution mode with reference to TOQ1 register value, each buffer which receives the active packet stores it at the tail of buffer location. At the same time, each buffer which is not empty transfers its head of packet to the second distributor 54. Since this distributor 54 preserves sequence between the packets outputted from buffer block 53, every input packets can be considered as the active packets, and the distributor 54 always operates as the normal distribution mode with reference to TOQ2 register value $k_2(=N-1-K)$.

Second step, packets failed in output contention process of switch network is inputted to previous distributor 52 through output selector 55. At this time, previous distributor 52 operates as the reversed distribution mode, since the fedback packet is stored faster than remaining packets in buffer, the fedback packet is stored in the head position of the buffer. Accordingly, the distributor of the present invention operating as the above do not use running adder by distributing running adder into reverse banyan network, simplify hardware by solving the problem which append/remove dummy header of the conventional distributor. Furthermore, when the distributor is adapted to a fast packet switch, its construction become simple and economic.

What is claimed is:

1. A distributor concentrating and outputting active packets among N input packets comprising: controlled switching element-based network comprising log N switching stages, each switching stage having N/2 control switching elements for switching channels of two input packets in accordance with external control input values received through an external control input port;

first switching stage from an output port of the controlled switching element-based network which receives each external control input value through external control input ports having a $2^0$ switching element as one unit;

second switching stage from the output port of the controlled switching element-based network which receives each external control input value through external control input ports having $2^1$ switching elements as one unit;

last switching stage from the output port of the controlled switching element-based network which receives each external control input value through external control input ports having $2^M$ (M being a natural number) switching elements as one unit;

active packet counting means counting and generating an output signal representing the number of said active packets inputted to said controlled switching element-based network;

tail-of-queue register storing an output vector value k mapping said active packet signals, outputting the value k in each time slot, and updating the value k in modulo-N operation when the output signal of said active packet counting means is inputted; and external control input generating means inputting the output vector value k which is the output signal of said tail-of-queue register, and generating an external control input value corresponding to the output vector value k providing to said controlled switching element in controlled switching element-based network.

2. A distributor claimed in claim 1, wherein said controlled switching element-based network is constructed for alternatively transferring said active packets from one switching element group when external control input value outputted from external control input generating means and applied to said last switching stage is 0, and for transferring said active packets from the other switching element group to one switching element group when external control input generating means output vector value is 1.

3. A distributor claimed in claim 1, wherein said controlled switching element-based network is constructed for transferring even active packets to one switching element group of the next stage and odd active packets to the other switching element group of the next stage, in case k is an even integer, and transferring even active packets to the other switching element group of the next stage and odd active packets to one switching element group of the next stage, in case k is an odd integer, when said active packets can be represented by output vectors $O_{m,k}$ (m=1, 2 ..., N, k=0, 1, ..., N−1) on the output port of controlled switching element-based network.

4. A distributor claimed in claim 1, wherein within said controlled switching element-based network only one set of external controlled inputs exists connecting a predetermined input vector consisting of m(=1, 2, ..., N) active packet to output port $O_{m,k}$ (k=o, 1, ..., N−1).

5. A distributor claimed in claim 1, wherein said controlled switching element of each switching element unit comprises:

2×2 switching element inputting two active packet signals and outputting two active packet signals by switching channel according to a control signal;

first Exclusive-OR element for inputting and modulo-summing one packet signal among said active packet signals and the control input signal which is independently applied by switching element unit, and providing its summed value output signal as the control signal to said 2×2 switching element;

second Exclusive-OR element for inputting and modulo-summing said two active packet signals and outputting its summed value; and third Exclusive-OR element for modulo-summing the external control signal which is independently applied by switching element unit and the output signal of said second Exclusive-OR element and providing its summed value as the external control signal to another controlled switching element.

6. A distributor concentrating and outputting active packets among N input packets comprising:

a controlled switching element-based network comprising log N switching stages, each switching stage having N/2 control switching elements for switching channels of two input packets in accordance with external control input values received through an external control input port;

first switching stage from an output port of the controlled switching element-based network which receives each external control input value through external control input ports having a $2^0$ switching element as one unit;

second switching stage from the output port of the controlled switching element-based network which receives each external control input value through external control input parts having $2^1$ switching elements as one unit;

last switching stage from the output port of the controlled switching element-based network which receives each external control input value through external control input parts having $2^M$ (M being a natural number) switching elements as one unit; and delay means delaying the final control output line value of said switching element unit in order to use external control input value of the next time slot and to provide external control input stage of said switching element applied to said first external control input in a corresponding unit.

7. A distributor claimed in claim 6, wherein said controlled switching element of each switching element unit comprises:

2×2 switching element inputting two active packet signals and outputting said two active packet signals by switching channel according to a control signal;

first Exclusive-OR element for inputting and modulo-summing one packet signal among said active packet signals and the control signal which is independently applied by switching element unit, and providing its summed value as control signal to said 2×2 switching element;

second Exclusive-OR element for inputting and modulo-summing said two active packet signals and outputting its summed value; and third Exclusive-OR element for inputting and modulo-summing the external control signal which is independently applied by switching element unit and the output signal of said second Exclusive-OR element and providing its summed value as the external control signal to another controlled switching element.

8. A distributor concentrating and outputting active packets among N input packets comprising:

a controlled switching element-based network comprising log N switching stages, each switching stage having N/2 parallel processing control switching elements for switching channels of two input packets in accordance with external control input values received through an external control input port;

first switching stage from an output port of the controlled switching element-based network which receives each external control input value through external control input ports having a $2^0$ parallel processing controlled switching element as one unit;

second switching stage from the output port of controlled switching element-based network which receives each external control input value through external control input ports having $2^1$ parallel processing controlled switching elements as one unit;

last switching stage from the output port of controlled switching element-based network which receives each external control input value through external control input ports having $2^M$ (M being a natural number) parallel processing controlled switching elements as one unit;

first summing means for summing the control input port and control output port signals of the parallel processing controlled switching element;

first delay means delaying the output signal of the first summing means and providing the delayed signal as the control input signal of said parallel processing controlled switching element;

first parallel processing control means for generating and providing corresponding said parallel processing control signal to a digital parallel processing controlled switching element;

second parallel processing control means, and a third to a final log N–1 parallel processing control means controlling additional parallel processing control means;

a second summing means for summing and outputting output and input signals of the final parallel processing control means;

a second delay means delaying the output signal of said second summing means and providing its delayed signal as one input of the final parallel processing control means in said each switching element unit.

9. A distributor claimed in claim 8, wherein said controlled switching elements of each switching element unit comprises:

2×2 switching element inputting two active packet signals and outputting said two active packet signals to the next switching stage by switching channel according to a control signal;

first Exclusive-OR element for inputting and modulo-summing said input active packet signals and providing its summed value as said parallel processing control output port signal;

second Exclusive-OR element for modulo-summing one packet signal among said input active packet signals and said parallel processing control input port signal, and providing its summed value as the control signal of said 2×2 switching element.

10. A distributor claimed in claim 8, wherein each of said parallel processing control means comprises:

first Exclusive-OR element for modulo-summing the control signal outputted through port of one controlled switching element among a distinct two parallel processing controlled switching elements and control signal inputted to control signal input port provided from said second delay means, and providing its summed signal as the control signal input stage of the other controlled switching element among said distinct two parallel processing controlled switching elements; and second Exclusive-OR element for modulo-summing the output port control signals of one and of the other controlled switching element among said distinct two parallel processing controlled switching elements and providing its summed signal as one input signal of said second summing means.

* * * * *